US008873828B2

(12) United States Patent
Nireki

(10) Patent No.: US 8,873,828 B2

(45) Date of Patent: Oct. 28, 2014

(54) DEVICE FOR PROCESSING PAPER SHEETS OR THE LIKE

(75) Inventor: Takao Nireki, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 283 days.

(21) Appl. No.: 12/933,575

(22) PCT Filed: Feb. 27, 2009

(86) PCT No.: PCT/JP2009/053660

§ 371 (c)(1),
(2), (4) Date: Sep. 20, 2010

(87) PCT Pub. No.: WO2009/116374

PCT Pub. Date: Sep. 24, 2009

(65) Prior Publication Data

US 2011/0019900 A1 Jan. 27, 2011

(30) Foreign Application Priority Data

Mar. 19, 2008 (JP) ................................ 2008-070848

(51) Int. Cl.

| | |
|---|---|
| ***G06K 9/00*** | (2006.01) |
| ***G07D 7/18*** | (2006.01) |
| ***G07D 7/16*** | (2006.01) |
| ***G07F 7/04*** | (2006.01) |

(52) U.S. Cl.

CPC ................ *G07D 7/185* (2013.01); *G07D 7/162* (2013.01); *G07D 7/166* (2013.01); *G07F 7/04* (2013.01)

USPC ............................ 382/135; 382/137; 382/100

(58) Field of Classification Search

None

See application file for complete search history.

(56) References Cited

U.S. PATENT DOCUMENTS

| | | | | |
|---|---|---|---|---|
| 4,726,474 | A * | 2/1988 | Arikawa et al. | 209/534 |
| 4,744,468 | A * | 5/1988 | Goi et al. | 209/534 |
| 5,005,688 | A * | 4/1991 | Yukimoto et al. | 194/206 |
| 5,437,357 | A * | 8/1995 | Ota et al. | 194/206 |
| 5,662,202 | A * | 9/1997 | Suris | 194/206 |
| 5,751,841 | A * | 5/1998 | Leong et al. | 382/137 |

(Continued)

FOREIGN PATENT DOCUMENTS

| | | |
|---|---|---|
| CN | 1441389 | 9/2003 |
| JP | 63 185756 | 8/1988 |

(Continued)

OTHER PUBLICATIONS

Chinese Office Action dated Aug. 30, 2012 of CN Patent Application No. 200980109844.7.

*Primary Examiner* — Avinash J Yentrapati

(74) *Attorney, Agent, or Firm* — Lexyoume IP Meister, PLLC

(57) ABSTRACT

A paper sheet processing apparatus capable of preventing conveyance failure of a paper sheet. The apparatus includes a bill insertion slot, a bill conveyance mechanism capable of conveying a bill inserted from the bill insertion slot, a bill reader reading the bill conveyed by the bill conveyance mechanism, an authenticity determination mechanism determining the authentication of the bill read by the bill reader, a bill determination processing part for determining, before the reading of the banknote by the banknote reader is completed, damage to the bill based on a shape of a portion of the bill which is read and on a shape of a reference bill, and a controller controlling conveyance of the bill by the bill conveyance mechanism based on a result of the determination by the bill determination processing part.

16 Claims, 15 Drawing Sheets

(56) References Cited

U.S. PATENT DOCUMENTS

| | | | | | |
|---|---|---|---|---|---|
| 5,758,759 | A * | 6/1998 | Negishi | 194/207 |
| 5,964,336 | A * | 10/1999 | Itako et al. | 194/207 |
| 5,992,601 | A * | 11/1999 | Mennie et al. | 194/207 |
| 6,040,584 | A * | 3/2000 | Liu et al. | 250/559.11 |
| 6,186,307 | B1 * | 2/2001 | Mukai | 194/206 |
| 6,398,000 | B1 * | 6/2002 | Jenrick et al. | 194/200 |
| 7,319,785 | B2 * | 1/2008 | Mori et al. | 382/135 |
| 7,421,106 | B2 * | 9/2008 | Mori et al. | 382/135 |
| 7,607,528 | B2 * | 10/2009 | Derks et al. | 194/206 |
| 7,631,743 | B2 * | 12/2009 | Takai et al. | 194/206 |
| 2003/0137095 | A1 * | 7/2003 | Ito et al. | 271/176 |
| 2005/0139447 | A1 * | 6/2005 | Minamishin et al. | 194/206 |
| 2005/0150738 | A1 * | 7/2005 | Hallowell et al. | 194/206 |
| 2005/0150740 | A1 * | 7/2005 | Finkenzeller et al. | 194/207 |
| 2006/0151282 | A1 * | 7/2006 | Derks et al. | 194/207 |
| 2007/0007103 | A1 * | 1/2007 | Takai et al. | 194/206 |
| 2010/0236892 | A1 * | 9/2010 | Jones et al. | 194/206 |

FOREIGN PATENT DOCUMENTS

| | | |
|---|---|---|
| JP | 6 36108 | 2/1994 |
| JP | 9 128585 | 5/1997 |
| JP | 10 11630 | 1/1998 |
| JP | 2003 223665 | 8/2003 |
| JP | 2004 139189 | 5/2004 |
| JP | 2006 302235 | 11/2006 |
| JP | 2009 42920 | 2/2009 |

* cited by examiner

DEVICE FOR PROCESSING PAPER SHEETS OR THE LIKE

FIELD OF THE INVENTION

The present invention relates to a paper sheet processing apparatus (or a device for processing paper sheets or the like) which is capable of performing an authenticity judgment for a bill, a card, a coupon ticket, and so on (hereafter collectively referred to as a paper sheet).

BACKGROUND ART

In general, a bill processing apparatus, which is one of the embodiments of the paper sheet processing apparatus, is incorporated into a service device such as a game medium rental machine installed in a game hall, a vending machine or a ticket-vending machine installed in a public space, or the like which identifies the validity of a bill inserted from a bill insertion slot by a user and provides various types of products and services in accordance with a value of the bill having been judged as valid.

For example, Patent Reference 1 discloses a bill processing apparatus comprising a conveyance mechanism to convey a bill inserted into a bill insertion slot and reading means for reading the bill, wherein the bill processing apparatus conveys the bill identified as legitimate as a result of an authenticity judgment of the bill read by the reading means toward a housing part, and returns the bill identified as counterfeit toward the bill insertion slot. Further, this Patent Reference 1 discloses that a pull-out prevention mechanism that prevents the bill from being drawn out toward the bill insertion slot is provided in order not to allow a bill drawing-out activity after reading information of the bill by the reading means. In general, it is reasonable to consider that bills or the like in various kinds of conditions are supposed to be inserted from a bill insertion slot with respect to such a bill processing apparatus. For example, those are bills having a defective leading end portion at the forefront in the insertion direction of the inserted bill and other damages. These bills, even though they are legitimate bills, may be hooked or caught by components, protrusions, depressed portions, and the like of the conveyance mechanism provided in a traveling route when the bills are conveyed, whereby a conveyance failure of the bills may be caused.

[Patent Reference 1] Japanese Unexamined Patent Application Publication No. 2006-302235

DISCLOSURE OF THE INVENTION

Problem to be Solved by the Invention

In consideration of the above, a paper sheet processing apparatus capable of preventing such a conveyance failure of a paper sheet is to be provided.

Means to Solve the Problem

In the present invention, a paper sheet processing apparatus includes: an insertion slot into which a paper sheet is inserted; a conveyance mechanism which is capable of conveying the paper sheet inserted from the insertion slot; reading means which reads the paper sheet being conveyed by the conveyance mechanism; and authenticity judging means which judges the authenticity of the paper sheet having been read by the reading device, and the apparatus comprises: damage determination means which determines damages of the paper sheet based on a shape of a reference paper sheet and a shape of a portion of the paper sheet having been read before the reading means completes reading the whole paper sheet; and control means which controls a conveyance of the paper sheet by the conveyance mechanism. Further features of the present invention, its nature, and various advantages will be more apparent from the accompanying drawings and the following description of the preferred embodiment.

BRIEF DESCRIPTION OF THE DRAWINGS

FIG. 7 is a block diagram showing a configuration of control means which controls driving members of a bill conveyance mechanism, bill reading means, and the like.

DESCRIPTION OF NOTATIONS

Figure 1:
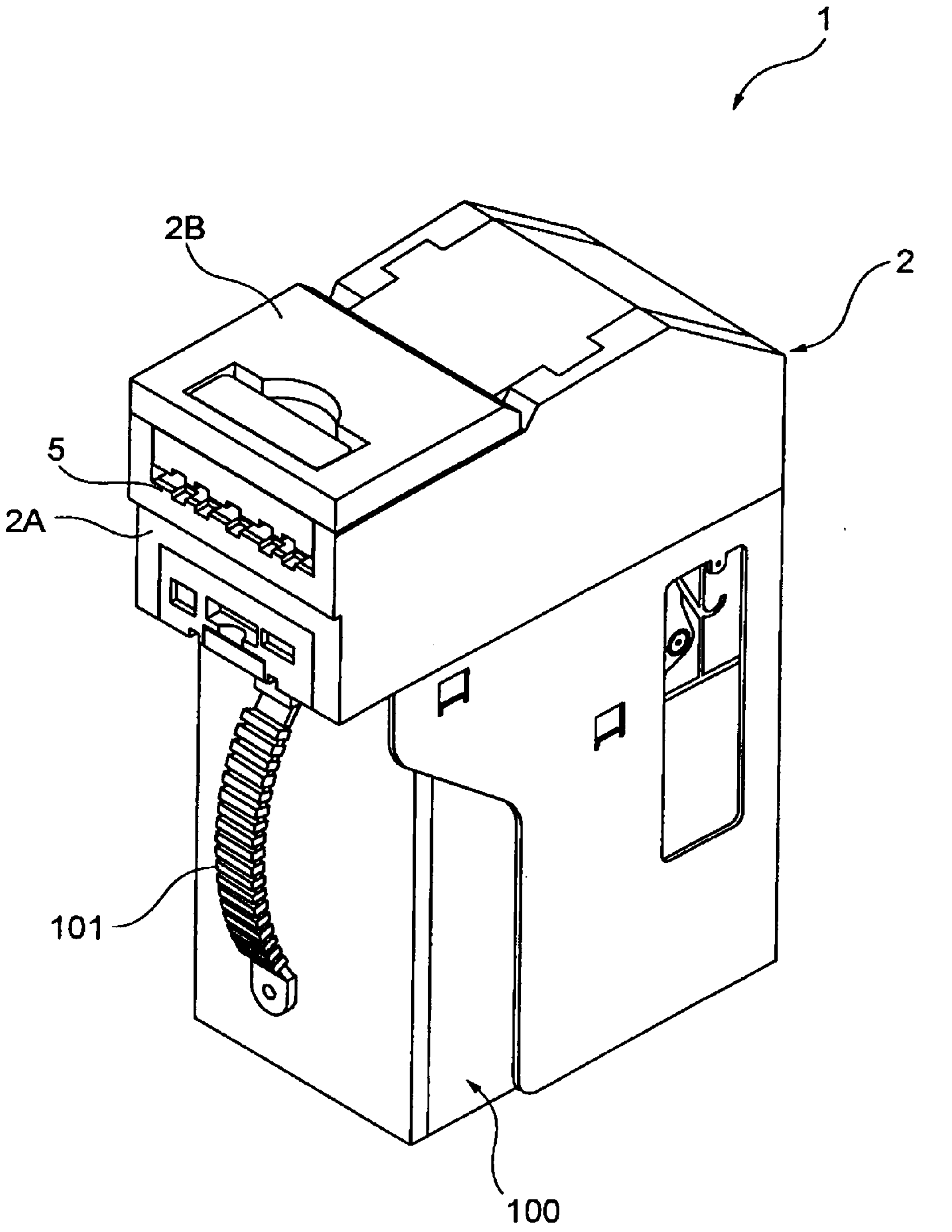
FIG. 1 is a perspective view showing an entire structure to illustrate a configuration of a bill processing apparatus of this embodiment.

1 bill processing apparatus
2 apparatus main body

3 bill traveling route
5 bill insertion slot
6 bill conveyance mechanism
8 bill reading means
10 skew correction mechanism
80*a* first light emitting part
81 light receiving/emitting unit
81*a* light receiving part
81*b* second light emitting part
200 control means

BEST MODE FOR CARRYING OUT THE INVENTION

Hereinafter, an embodiment of the present invention will be described with reference to the drawings.

Figure 2:
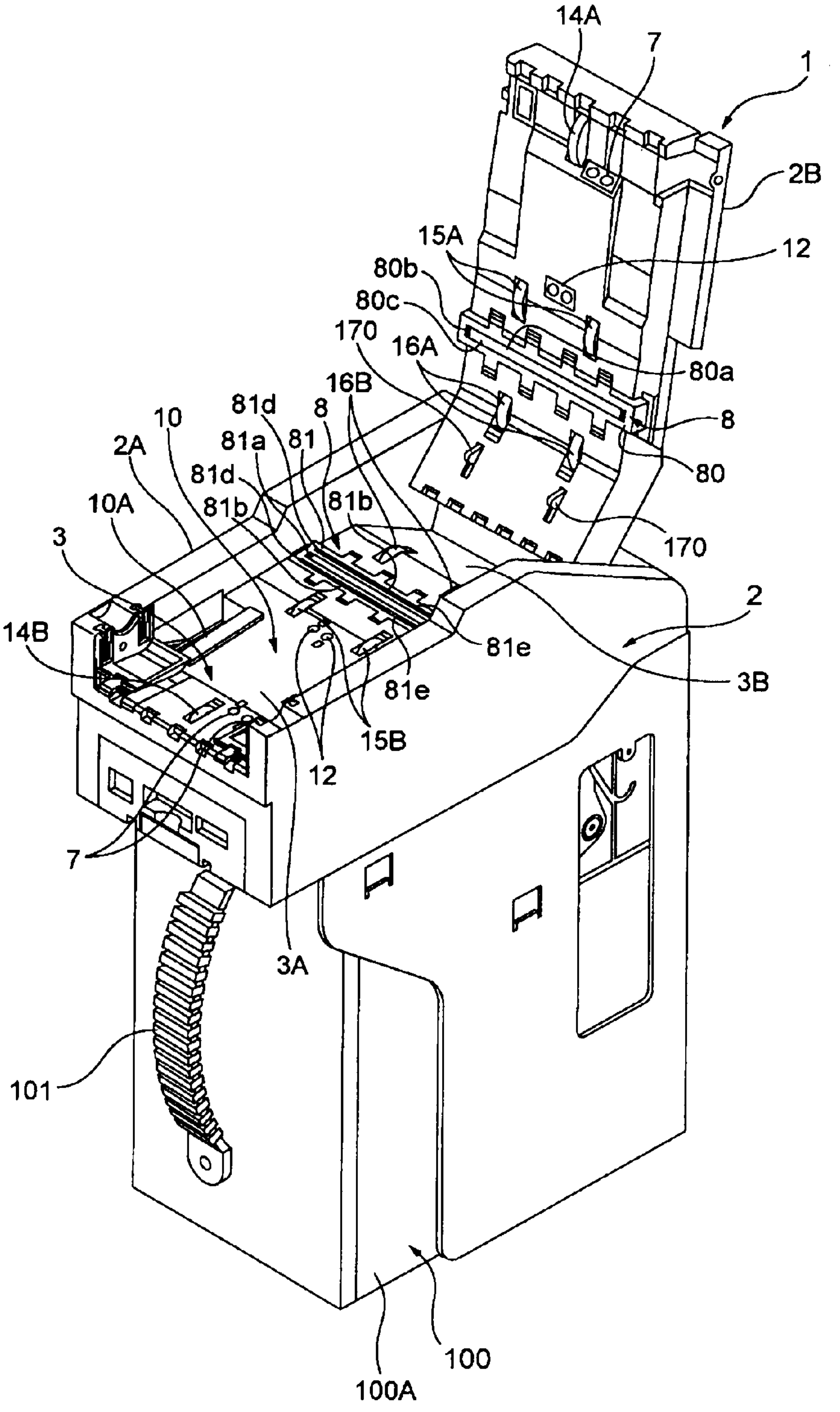
FIG. 2 is a perspective view showing the bill processing apparatus in a state that an open/close member is opened for a main body frame of an apparatus main body.
Figure 3:
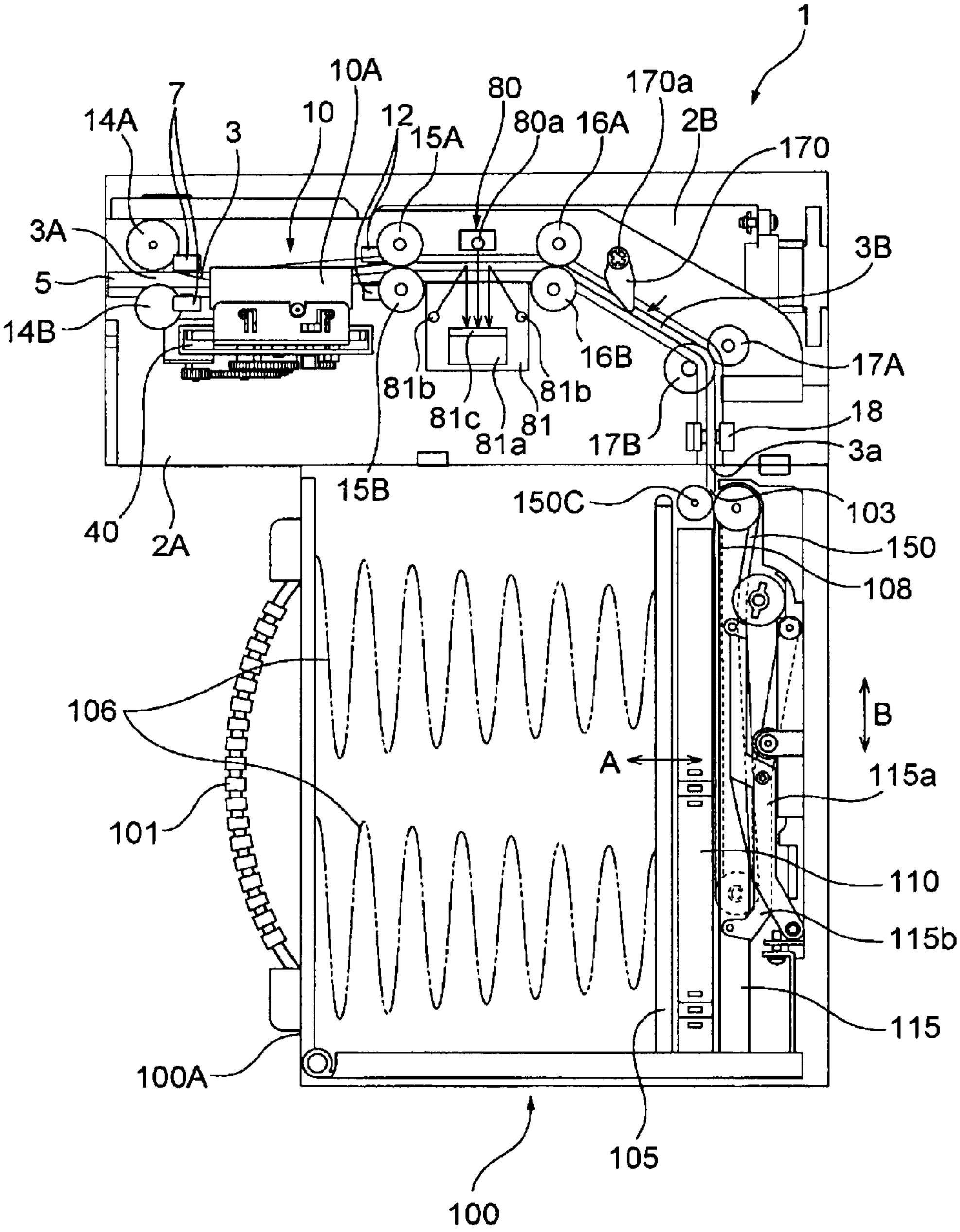
FIG. 3 is a right side view schematically showing a traveling route of a bill to be inserted from an insertion slot.
Figure 4:
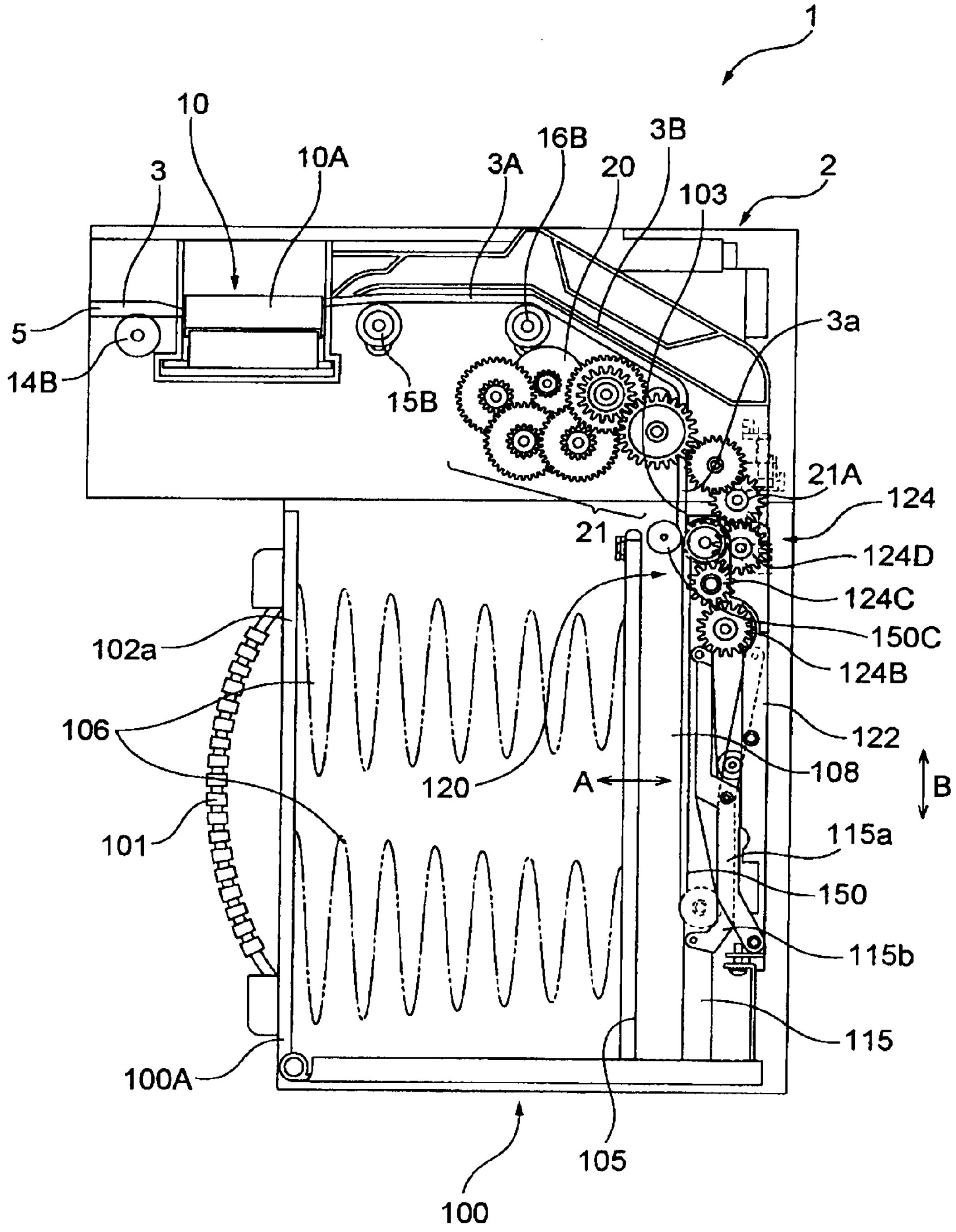
FIG. 4 is a right side view showing a schematic configuration of a power transmission for driving the presser plate arranged in a bill housing part.
Figure 5:
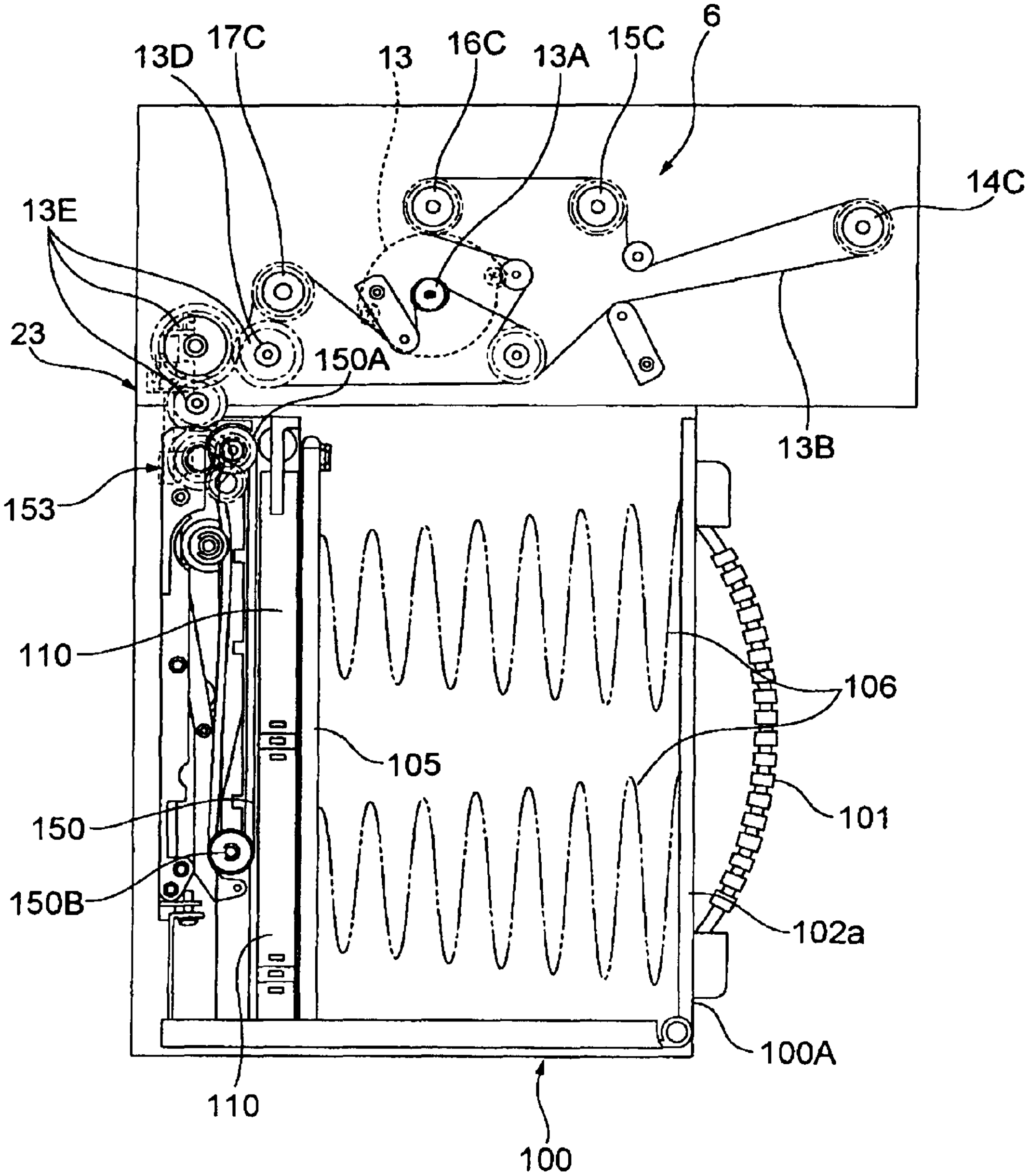
FIG. 5 is a left side view showing a schematic configuration of a driving source and a driving force transmission mechanism to drive a bill conveyance mechanism.

FIGS. 1 to 5 are diagrams showing a configuration of a bill processing apparatus according to this embodiment. FIG. 1 is a perspective view showing a general configuration thereof; FIG. 2 is a perspective view showing a state that an open/close member is opened for a main body frame of an apparatus main body; FIG. 3 is a right side view showing schematically a traveling route for a bill inserted from an insertion slot; FIG. 4 is a right side view showing schematically a power transmission mechanism for driving a presser plate installed in a bill housing part; and FIG. 5 is a left side view showing a schematic configuration of a driving source and a driving force transmission mechanism to drive a bill conveyance mechanism.

A bill processing apparatus 1 of this embodiment is so configured that it can be incorporated into, for example, various types of gaming machines such as a slot machine and the like, and the bill processing apparatus 1 includes an apparatus main body 2 and a housing part (stacker or cashbox) 100 which is provided to the apparatus main body 2 and is capable of stacking and housing a great number of bills. Here, the housing part 100 may be mountable to and demountable from the apparatus main body 2, and it is possible, for example, to remove it from the apparatus main body 2 by pulling a handle 101 provided on the front face thereof in a state that a lock mechanism (not shown) is unlocked.

As shown in FIG. 2, the apparatus main body 2 has a main frame body 2A and an open/close member 2B being configured to be opened and closed for the main body frame 2A by rotating around an axis positioned at one end thereof as a rotating center. Then, as shown in FIG. 3, the frame 2A and the open/close member 2B are configured to form a space (bill traveling route 3) through which a bill is conveyed such that both face each other across the space when the open/close member 2B is closed for the main body frame 2A, and to form a bill insertion slot 5 such that front exposed faces of both are aligned and that the bill traveling route 3 exits at the bill insertion slot 5. In addition, the bill insertion slot 5 is a slit-like opening from which a short side of a bill can be inserted into the inside of the apparatus main body 2.

Also, in the apparatus main body 2, a bill conveyance mechanism 6 that conveys a bill along a bill traveling route 3; an insertion detecting sensor 7 that detects the bill inserted into the bill insertion slot 5; bill reading means 8 that is installed on a downstream side of the insertion detecting sensor 7 and reads out information on the bill in a traveling sate; a skew correction mechanism 10 that accurately positions and conveys the bill with respect to the bill reading means 8; a movable piece passage detecting sensor 12 that detects that the bill passes through a pair of movable pieces constituting the skew correction mechanism; and a discharge detecting sensor 18 that detects that the bill is discharged into a bill housing part 100 are provided.

Hereafter, the respective components described above will be described in detail.

The bill traveling route 3 extends from the bill insertion slot 5 toward the inside, and comprises a first traveling route 3A and a second traveling route 3B extending from the first traveling route 3A toward the downstream side and being inclined downwardly at a predetermined angle to the first traveling route 3A. The second traveling route 3B is bent in a vertical direction on the downstream side and a discharge slot 3*a* from which the bill is discharged into the bill housing part 100 is formed at an end portion on the downstream side such that the bill discharged from the discharge slot 3*a* is fed into a feed port (receiving port) 103 of the bill housing part 100 in the vertical direction.

The bill conveyance mechanism 6 is a mechanism capable of conveying the bill inserted from the bill insertion slot 5 along the insertion direction, and of conveying back the bill in an insertion state toward the bill insertion slot 5. The bill conveyance mechanism 6 comprises a motor 13 (refer to FIG. 5) serving as a driving source installed in the apparatus main body 2; and conveyor roller pairs (14A and 14B), (15A and 15B), (16A and 16B), and (17A and 17B) which are installed with predetermined intervals along the bill traveling direction in the bill traveling route 3, and are driven to rotate by the motor 13.

The conveyor roller pairs are installed so as to be partially exposed on the bill traveling route 3, and all the pairs are constituted of driving rollers of the conveyor rollers 14B, 15B, 16B, and 17B installed on the underside of the bill traveling route 3 driven by the motor 13; and pinch-rollers of the conveyor rollers 14A, 15A, 16A, and 17A installed on the upperside and driven by the these driving rollers. In addition, the conveyor roller pair (14A and 14B) to first nip and hold therebetween the bill inserted from the bill insertion slot 5, and to convey the bill toward the back side, as shown in FIG. 2, is installed in one portion of the center position of the bill traveling route 3, and a couple of the conveyor roller pairs (15A and 15B), (16A and 16B), or (17A and 17B) being disposed in this order on the downstream side thereof are respectively installed in a couple of portions with a predetermined interval in the lateral direction of the bill traveling route 3.

Further, the conveyor roller pair (14A and 14B) disposed in the vicinity of the bill insertion slot 5 is usually in a state that the upper conveyor roller 14A is spaced from the lower conveyor roller 14B, and the upper conveyor roller 14A is driven to move toward the lower conveyor roller 14B to nip and hold the inserted bill therebetween when insertion of the bill is detected by the insertion detecting sensor 7.

Thus, the upper conveyor roller 14A is controllably driven to be pressed against or spaced from the lower conveyor roller 14B by a motor 70 (refer to FIG. 7) for an up-and-down movement of the roller as a driving source. In this case, when a process (skew correction process) for positioning the bill with respect to the bill reading means 8 by eliminating inclination of the inserted bill is executed by the skew correction mechanism 10, the upper conveyor roller 14A is spaced from the lower conveyor roller 14B so as to release the load on the bill, and when the skew correction process is completed, the upper conveyor roller 14A is driven to move toward the lower conveyor roller 14B again to hold (or nip) the bill therebetween. Here, the driving source may be constituted of a solenoid or the like instead of a motor.

Further, the skew correction mechanism 10 comprises a pair of right and left movable pieces 10A (only one side is shown) such that the pair of right and left movable pieces 10A are moved to get closer with each other by driving a motor 40 for a skew driving mechanism, whereby the skew correction process is performed for the bill.

The conveyor rollers 14B, 15B, 16B and 17B installed on the underside of the bill traveling route 3 are, as shown in FIG. 5, driven to rotate via the motor 13 and pulleys 14C, 15C, 16C, and 17C installed at the ends of the driving shafts of the respective conveyor rollers. That is, a driving pulley 13A is installed on the output shaft of the motor 13, and a driving belt 13B is wrapped around between the pulleys 14C, 15C, 16C, and 17C installed at the ends of the driving shafts of the respective conveyor rollers and the driving pulley 13A. In addition, tension pulleys are engaged in places with the driving belt 13B, which prevents the driving belt 13B from loosening.

In accordance with the configuration described above, when the motor 13 is driven to normally rotate, the conveyor rollers 14B, 15B, 16B, and 17B are driven to normally rotate in synchronization therewith to convey the bill toward the insertion direction. When the motor 13 is driven to reversely rotate, the conveyor rollers 14B, 15B, 16B, and 17B are driven to reversely rotate in synchronization therewith to convey back the bill toward the bill insertion slot 5 side.

The insertion detecting sensor 7 is to generate a detection signal when a bill inserted into the bill insertion slot 5 is detected. And when the detection signal is generated, the motor 13 is driven in a normal direction and the bill is conveyed in the insertion direction. The insertion detecting sensor 7 of this embodiment is installed between the pair of conveyor rollers (14A and 14B) and the skew correction mechanism 10 and comprises, for example, an optical sensor such as a regressive reflection type photo sensor. However, the insertion detecting sensor 7 may comprise a mechanical sensor other than the optical sensor.

Further, the movable piece passage detecting sensor 12 is to generate a detection signal when it is detected that a front end of the bill passes through a pair of right and left movable pieces 10A constituting the skew correction mechanism 10, and when the detection signal is generated, the driving by the motor 13 is stopped such that the skew correction is made. The movable piece passage detecting sensor 12 of this embodiment is disposed on the upstream side from the bill reading means 8 and also comprises an optical sensor or a mechanical sensor in the same way as mentioned before with respect to the insertion detecting sensor.

Further, the discharge detecting sensor 18 is to detect a trailing end of the bill passing through such that it is detected that the bill is discharged into the bill housing part 100. The discharge detecting sensor 18 is disposed just in front of the receiving port 103 of the bill housing part 100 on the downstream side of the second traveling route 3B. When the detection signal is transmitted from the discharge detecting sensor 18, the driving by the motor 13 is stopped and the conveyance processing of the bill is terminated. The discharge detecting sensor 18 also comprises an optical sensor or a mechanical sensor in the same way as the aforementioned insertion detecting sensor.

The bill reading means 8 reads bill information on the bill conveyed in a state that the skew is eliminated by the skew correction mechanism 10, and determines the validity (authenticity). In this embodiment, the bill reading means 8, which is installed in the above-mentioned first traveling route 3A, comprises a line sensor which irradiates the bill being conveyed from top and bottom sides thereof with light such that a transmitted light and a reflected light thereof are detected by a light receiving element so as to perform reading.

Further, the bill reading means 8 has a function of determining first whether or not the bill is damaged when executing reading of the bill being conveyed. That is, a predetermined leading end area of the bill to be conveyed is read by the bill reading means 8 to be utilized, and it is determined by damage determination means, to be described later, whether or not the leading end area is damaged based on the read information. This damage determination process for the bill is executed before executing a bill authenticity judgment process, and the determination is made whether or not the bill is damaged at least before the completion of reading of bill information in order to execute an authenticity judgment process (a concrete method, a timing, and the like of the determination process will be described later).

Then, the authenticity judgment process is executed for the bill having been determined not to be damaged by executing the above-described damage determination process. The above-mentioned first and second authenticity judgment processes are performed by irradiating the light having the predetermined wavelength from the light emitting means to a printed area on the surface of the bill being conveyed, acquiring transmitted-light data of the light transmitted through the bill and reflected-light data of the light reflected by the bill, and comparing such data with the reference data of the legitimate bill having stored in advance.

In this case, since the legitimate bill has some area from which different image data are acquired depending on the wavelengths of the lights (for example, visible light or infrared light) irradiated to the area, in this embodiment, a plurality of light sources, in consideration of this view point, irradiate different lights of different wavelengths (in this embodiment, a red light and an infrared light are irradiated) to the bill and a transmitted light therethrough and a reflected light thereon are detected such that the authenticity identification accuracy may be improved. That is, since the red light and the infrared light have different wavelengths, transmitted-light data and reflected-light data from a plurality of lights of different wavelengths may be utilized for the bill authenticity judgment whereby the judgment may use the nature that the transmittance of the transmitted light transmitted through the specific area and the reflectance of the reflected light reflected on the specific area in the legitimate bill are different from those of the counterfeit bill. Therefore, an attempt is made to further improve the bill authenticity identification accuracy by employing light sources where a plurality of wavelengths are available. Such a specified area is an area to be utilized for specifically determining the authenticity of the bill, and is therefore generally arranged in the center or at a position sufficiently close to the center rather than a marginal part of the bill. Accordingly, the specified area may be an area posterior to a so-called leading end area located at the forefront in the traveling direction of the bill (i.e., an area on the side of the insertion slot or in the center portion of the bill). A design or the like which can be utilized for the authenticity judgment may be drawn in the area. For example, the area may include a so-called watermark area.

Here, since it is possible to acquire various kinds of received-light data (transmitted-light data and reflected-light data) depending on the wavelengths of the irradiated lights to the bill and the irradiated areas of the bill, although a concrete bill authenticity identification method will not be written in detail, the image appears greatly different depending on the lights in a watermark area of the bill, for example, if an image on the area is viewed with the lights of different wavelengths. Therefore, it can be considered that the bill to become an identification object is identified as the legitimate bill or the counterfeit bill by setting this portion as the specified area, acquiring transmitted-light data and reflected-light data from the specified area, and comparing such data with legitimate data from the same specified area of the legitimate bill having been stored in advance in storage means (ROM). At this time, provided that specified areas are predetermined according to the kinds of the bills, and that predetermined weighting may be applied to the transmitted-light data and the reflected-light data from this specified area, the authenticity identification accuracy may be improved.

Then, since the above-mentioned bill reading means 8 is, to be described later, configured to perform the lighting control of the light emitting part with a predetermined interval and to comprise the line sensor which detects the transmitted light and the reflected light as the bill passes through, it is possible to acquire the image data based on the plurality of pieces of pixel information in a predetermined size as a unit by the line sensor.

In this case, the image data acquired by the line sensor is converted into data containing color information having brightness for each pixel by a converter which will be described later. In addition, the color information of each pixel having brightness to be converted by the converter corresponds to a contrasting density value, i.e., a density value (luminance value), and a numerical value from 0 to 255 (0: black to 255: white) is allocated to each pixel, for example, as information of one byte according to its density value.

Therefore, in the authenticity judgment process, the predetermined area of the bill may be extracted; the pixel information (density values) contained in the area and the pixel information in the same area of the legitimate bill may be used so as to be substituted into an appropriate correlating equation; and then a coefficient of correlation may be obtained by carrying out an operation thereof, whereby the authenticity identification may be judged by the coefficient. Or, in addition to the above description, analog waveforms, for example, may be generated from the transmitted-light data and the reflected-light data, and the respective shapes of those waveforms may be compared with each other, whereby the authenticity identification may be judged by such comparison. Moreover, a process in which the length of the printed area of the bill is detected and the authenticity thereof is identified by utilizing the length information, may be provided.

Further, with respect to a damage determination process executed in advance of an authenticity judgment process, in consideration that the above-described line sensor is capable of reading an overall width of the bill to acquire a two-dimensional image as the bill is conveyed, image information of a leading end area of the bill acquired by the line sensor is compared with a shape of a bill serving as a standard (a reference shape image), and it is determined that the bill is damaged, for example, if the bill does not match the reference shape image. Here, the leading end of the bill may mean a marginal side on the side of the housing part, which is the forefront in the traveling direction of the bill. Further, the leading end area of the bill may mean an area extending from the leading end toward the central part of the bill for a predetermined distance along the traveling direction. Further, the leading end area of the bill may mean an area which does not reach the specified area serving as an object of the authenticity judgment process.

Here, the configuration of above-mentioned reading means 8 will be described in detail with reference to FIGS. 2 and 3.

The abovementioned bill reading means 8 has a light emitting unit 80 which is installed on the side of the open/close member 2B and provided with a first light emitting part 80*a* capable of irradiating the upper side of the bill to be conveyed with the infrared light and the red light, and a light receiving/emitting unit 81 which is installed on the side of the main body frame 2A.

The light receiving/emitting unit 81 has a light receiving part 81*a* which is provided with a light receiving sensor facing the first light emitting part 80*a* across the bill and second light receiving parts 81*b* which are installed adjacently on the both sides of the light receiving part 81*a* along the bill traveling direction and are capable of irradiating the object with the infrared light and the red light.

The first light emitting part 80*a* disposed to face the light receiving part 81*a* works as a light source for the transmissive light. This first light emitting part 80*a* is, as shown in FIG. 2, comprised of a rectangular bar-like body made of synthetic resin which emits the light guided through a light guiding body 80*c* provided inside from an LED element 80*b* fixed to one end of the bar-like body. The first light emitting part having such a configuration is linearly installed in parallel with the light receiving part 81*a* (light receiving sensor) so as to be capable of entirely and equally irradiating the entire range in the width direction of the traveling route of the bill to be conveyed although the configuration is simple.

The light receiving part 81*a* of the light receiving/emitting unit 81 is formed in a thin-walled plate shape having a band shape extending in a lateral direction of the bill traveling route 3 and having a width to an extent that the sensitivity of the light receiving sensor (not shown) provided in the light receiving part 81*a* is not affected. In addition, the light receiving sensor is configured as a so-called line sensor in which a plurality of CCDs (Charge Coupled Devices) are provided linearly at the center in the thickness direction of the light receiving part 81*a*, and a GRIN lens array 81*c* is disposed linearly above these CCDs so as to collect the transmitted light and the reflected light. Therefore, it is possible to receive the transmitted light or the reflected light of the infrared light or the red light emitted from the first light emitting part 80*a* or the second light emitting parts 81*b* such that the bill serving as the object for authenticity judgment is irradiated with the infrared light or the red light, and generate contrasting density data according to its luminance (pixel data containing information of brightness) as the received-light data and a two-dimensional image based on the contrasting density data.

The second light emitting part 81*b* of the light receiving/emitting unit 81 works as a light source for the reflection light. This second light emitting part 81*b* is, in a similar manner as the first emitting part 80*a*, comprised of a rectangular bar-like body made of synthetic resin which emits the light guided through a light guiding body 81*e* provided inside from an LED element 81*d* fixed to one end of the bar-like body. The second light emitting part 81*b* is also configured to be linearly installed in parallel with the light receiving part 81*a* (line sensor).

The second light emitting parts 81*b* are capable of irradiating the bill with the light at an elevation angle of 45 degrees, for example, and are so installed that the light receiving part 81*a* may receive the reflected light from the bill. In this case, the lights irradiated to the bill by the second light emitting parts 81*b* are to be made incident at 45 degrees onto the light receiving part 81*a*, but the incident angle is not limited to 45 degrees such that the arrangement may be re-arranged as appropriate as long as the lights are irradiated evenly without shading to the surface of the bill. Therefore, the arrangement of the second light emitting parts 81*b* and the light receiving part 81*a* may be appropriately changed in design in accordance with the structure of the bill processing apparatus. Further, the second light emitting parts 81*b* are disposed on the both sides of the light receiving part 81*a* so as to be disposed across the light receiving part 81*a* and irradiate the bill with the respective lights at respective incident angles of 45 degrees. This is because, in the case where the surface of the bill has scratches or folded wrinkles, and in the case where the light is irradiated only from one side to an uneven surface generated by these scratches or folded wrinkles, it is unavoidable to make some portions shaded to cause shadow in the uneven surface. Therefore, it is prevented that the shadow is made in the portion of the uneven surface by irradiating the bill with the lights from the both sides, whereby the image data to be acquired can have a higher degree of accuracy than that of the single side irradiation. However, the second light emitting part 81*b* may be installed only on one side to configure the apparatus.

In addition, the configuration, the arrangement, and the like of the light emitting unit 80 and the light receiving/emitting unit 81 as described above are not limited to those described in this embodiment, and may be modified as appropriate.

Figure 6:
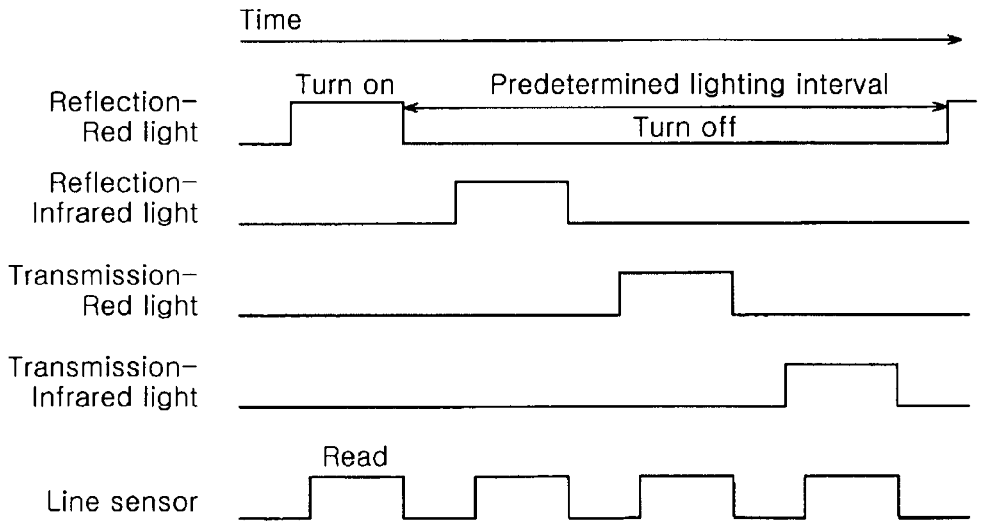
FIG. 6 shows a timing diagram illustrating lighting control of a light emitting part when the bill is read, which indicates the lighting control of the light emitting part in the bill reading means.

Further, in the respective first light emitting part 80*a* and second light emitting part 81*b* in the above-described light emitting unit 80 and the light receiving/emitting unit 81, when the bill is read, as shown in a timing diagram of FIG. 6, an infrared light and a red light are controlled to be turned on and off with predetermined intervals. That is, the lighting control is performed such that the four light sources constituted of the transmitting light sources of the red light and the infrared light and the reflecting light sources of the red light and the infrared light in the first light emitting part 80*a* and the second light emitting parts 81*b* repeatedly turn on and off the lights with a constant interval (predetermined lighting interval), and two or more of the light sources do not simultaneously turn on the lights without overlapping the on-phases of the respective light sources in any case. In other words, lighting control is performed such that, while any one light source is turned on, the other three light sources are turned off. Thereby, as described in this embodiment, it is possible even for the one light receiving part 81*a* to detect each light from each light source at a constant interval such that an image constituted of contrasting density data on a printed area of the identification object can be read out by a transmitted light and a reflected light of the red light and a transmitted light and a reflected light of the infrared light. In this case, it is also possible to improve the resolution by controlling the lighting interval to be made shorter.

The bill housing part 100 which houses the above-described bill and the like is so configured as to stack and house sequentially bills identified as genuine by the bill reading means 8.

As shown in FIGS. 3 to 5, the main body frame 100A constituting the bill housing part 100 is formed into a substantially rectangular parallelepiped (or cuboid) shape, and one end of bias means (e.g., bias spring) 106 is attached to an interior side of a front wall 102*a* thereof, and a placing plate 105 on which bills to be fed via the above-described receiving port 103 are sequentially stacked is provided to the other end thereof. Therefore, the placing plate 105 is in a state that it is pressed toward the presser plate 115, which will be described later, by the bias means 106.

In the main body frame 100A, a press standby part 108 that keeps a dropping bill as it falls is provided so as to continuously communicate with the receiving port 103. A pair of regulatory members 110 are disposed on both sides of the press standby part 108, respectively, the regulatory members 110 extending in a vertical direction. An opening is formed between the pair of regulatory members 110 such that the presser plate 115 passes through the opening as bills are successively stacked onto the placing plate 105.

Further, the presser plate 115 that presses toward the placing plate 105 a bill falling into the press standby part 108 from the receiving port 103 is installed in the main body frame 100A. The presser plate 115 is formed in such a size that it may be capable of reciprocating through an opening formed between the pair of regulatory members 110, and gets into the opening so as to be driven to reciprocate between a position where the bills are pressed against the placing plate 105 (a pressing position) and another position where the press standby part 108 is opened (an initial position). In this case, the bill passes through the opening as being flexibly bent in a pressing operation of the presser plate 115 and is then placed on the placing plate 105.

The presser plate 115 is driven to reciprocate as described above via a presser plate driving mechanism 120 installed in the main body frame 100A. The presser plate driving mechanism 120 comprises a pair of link members 115*a* and 115*b* having respective ends thereof supported pivotally by the presser plate 115 so as to allow the presser plate 115 to reciprocate in an arrow A direction in FIGS. 3 and 4, and these link members 115*a* and 115*b* are connected in a shape of letter "X", and the other ends opposite to the respective ends are supported pivotally by a movable member 122 installed movably in a vertical direction (an arrow B direction). A rack is formed in the movable member 122, and a pinion constituting the presser plate driving mechanism 120 is geared (engaged) with the rack.

As shown in FIG. 4, a housing part side gear train 124 constituting the presser plate driving mechanism 120 is connected to the pinion. For this case, as shown in FIG. 4, in this embodiment, a driving source (a motor 20) and a main body side gear train 21 sequentially engaged with the motor 20 are installed in the above-described apparatus main body 2, and when the bill housing part 100 is mounted to the apparatus main body 2, the main body side gear train 21 is to be connected to the housing part side gear train 124. That is, the housing part side gear train 124 comprises a gear 124B installed on the same axis of the pinion and gears 124C, 124D to be engaged sequentially with the gear 124B, and when the bill housing part 100 is mounted to and demounted from the apparatus main body 2, the gear 124D is configured to be engaged with and disengaged from a final gear 21A of the main body side train 21.

As a result therefrom, the presser plate 115 is driven to reciprocate in the arrow A direction as the motor 20 installed in the apparatus main body 2 is driven to rotate so as to drive the main body side train 21 and in turn the presser plate driving mechanism 120 (the housing part side gear train 124, the rack installed onto the movable member 122, and the link members 115*a*, 115*b*, etc.).

Conveyor members 150 which are capable of touching the bill conveyed-in from the receiving port 103 are installed in the main body frame 100A. The conveyor members 150 take their own role to contact the bill conveyed-in so as to stably guide the bill to an appropriate position in the press standby part 108 (position where the bill can be stably pressed without causing the bill to be moved to the right or left side when the bill is pressed by the presser plate 115). In this embodiment, the conveyor members are constituted of belt-like members (hereafter called belts 150) installed so as to face the press standby part 108.

In this case, the belts 150 are installed so as to extend along the conveying-in direction with respect to the bill, and are wrapped around the pair of pulleys 150A and 150B supported rotatably on both ends in the conveying-in direction. Further, the belts 150 contact a conveyor roller 1500 extending in an axis direction which is supported rotatably in the region of the receiving port 103, and the belts 150 and the conveyor roller 150C nip and hold the bill conveyed-in the receiving port 103 therebetween to guide the bill directly to the press standby part 108. Moreover, in this embodiment, the pair of belts 150 are provided on the right and left sides, respectively, across the above-described presser plate 115 in order to be capable of contacting the surface on left and right sides of the bill. Here, the belts 150 may be prevented from loosening by not only being wrapped around the pulleys 150A and 150B at the both ends, but also causing tension pulleys to push the belts 150 at the intermediate positions, respectively.

The pair of belts 150 are configured to be driven by the motor 13 that drives the above-described plurality of conveyor rollers installed in the apparatus main body 2. In detail, as shown in FIG. 5, the above-described driving belt 13B driven by the motor 13 is wrapped around a pulley 13D for the driving force transmission, and a gear train 153 installed at the end of the spindle of the pulley 150A supported rotatably on the receiving port 103 side is engaged with a gear train 13E for the power transmission sequentially installed onto the pulley 13D. That is, when the bill housing part 100 is mounted to the apparatus main body 2, an input gear of the gear train 153 is configured to be engaged with a final gear of the gear train 13E, and the pair of belts 150 are configured to be driven to rotate in a synchronized manner with the above-described conveyor rollers 14B, 15B 16B, and 17B for conveying the bill by driving the motor 13 to rotate.

As described above, when the bill is inserted into the inside via the bill insertion slot 5, the bill is moved inside the bill traveling route 3 by the bill conveyance mechanism 6. The bill traveling route 3 is extended from the bill insertion slot 5 toward the back side, and comprises a first traveling route 3A and a second traveling route 3B which is extended from the first traveling route 3A toward downstream side and is inclined at a predetermined angle to the first traveling routes 3A.

Further, a pull-out preventing member (shutter member) 170 that prevents the bill from being conveyed toward the bill insertion slot 5 is installed in the second traveling route 3B. The pull-out preventing member 170 is biased to rotate in the arrow direction of FIG. 3 (a direction in which the second traveling route 3B is closed) via a spindle 170*a*, and when the bill moves toward the side of the bill housing part 100, the pull-out preventing member 170 is rotated so as to open the second traveling route against the biasing force, and when the bill once passes through the second traveling route, the pull-out preventing member 170 is rotated in the arrow direction to close the second traveling route 3B. That is, when the rear end of the bill passes through the pull-out preventing member 170, the second traveling route 3B is closed by the pull-out preventing member 170, not to allow the bill to be drawn out.

In addition, such pull-out preventing members may be installed at a plurality of places along the traveling route on the downstream side of the bill reading means 8. Further, their installing positions may be on the side downstream from the position at which the bill is stopped at the time of carrying out the bill authenticity judgment process (an escrow position; a position on the downstream side by approximately 13 mm from the bill reading means 8 in this embodiment).

Next, control means 200 that controls the driving of the bill conveyance mechanism 6, the bill reading means 8 and the like as mentioned above will be described with reference to a block diagram of FIG. 7.

Figure 7:
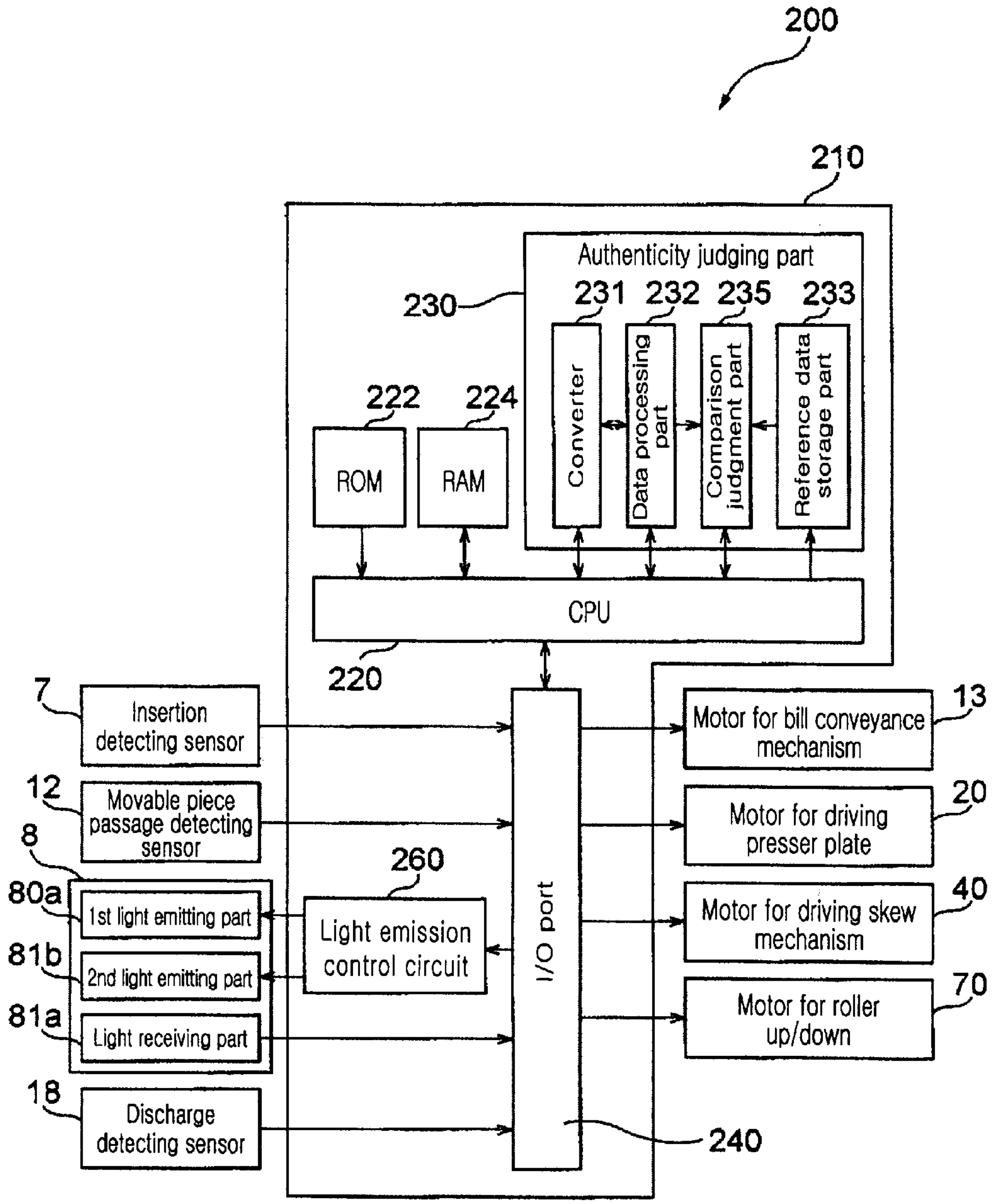

The control means 200 as shown in the block diagram of FIG. 7 comprises a control board 210 which controls the operations of the above-described respective drive units. And a CPU (Central Processing Unit) 220 of a processor controlling driving of each drive unit and constituting the bill identification means, a ROM (Read Only Memory) 222, a RAM (Random Access Memory) 224, and an authenticity judging part 230 are implemented on the control board 210.

In the ROM 222, permanent data such as various types of programs such as an authenticity judgment program in the authenticity judging part 230, operation programs for the respective drive units such as the motor 13 for the bill conveyance mechanism, the motor 20 for the presser plate, the motor 40 for the skew correction mechanism, and the roller up-and-down motor 70 for lifting up and down rollers, and the like are stored.

The CPU 220 operates according to the programs stored in the ROM 222, and carries out input and output of the signals with respect to the respective drive units described above via an I/O port 240, so as to perform the entire operational control of the bill processing apparatus. That is, the motor 13 for the bill conveyance mechanism, the motor 20 for the presser plate, the motor 40 for the skew correction mechanism, and the roller up-and-down motor 70 are connected to the CPU 220 via the I/O port 240, and the operations of these drive units are controlled by control signals transmitted from the CPU 220 in accordance with the operation programs stored in the ROM 222. Further, the CPU 220 is so configured that detection signals from the insertion detecting sensor 7, the movable piece passage detecting sensor 12, and the base part detecting sensor 18 are input into the CPU 220 via the I/O port 240, and the driving of the respective drive units is controlled based on these detection signals.

Moreover, the CPU 220 is so configured that a detection signal based on a transmitted light and a reflected light of the light which is irradiated to the identification object is input into the CPU 220 via the I/O port 240 from the light receiving part 81*a* in the bill reading means 8 as described above.

The RAM 224 temporarily stores data and programs used for the CPU 220 to operate, and also acquires and temporarily stores the received light data (image data constituted of a plurality of pixels) of the bill serving as the identification object.

The authenticity judging part 230 has a function to carry out the damage determination process to determine damages such as a missing portion at the leading end of the conveyer being conveyed and the authenticity judgment process for the bill which does not have such a missing portion, in which it is determined whether or not the bill without any missing portions at the leading end is legitimate. The authenticity judging part 230 has a converter 231 which converts the received light data of the identification object stored in the RAM 224 into pixel information containing color information having brightness (density value) for each pixel, and a data processing part 232 which specifies the leading end shape of the bill being conveyed by acquiring, for example, edge information based on the pixel information having converted by the converter 231.

Further, the authenticity judging part 230 has a reference data storage part 233 in which the reference data of the legitimate bill (shape data of the legitimate bill) is stored, and a comparison judgment part 235 which compares the shape data of the bill serving as the determination object specified by the data processing part 232 with the reference data stored in the reference data storage part 233 and carries out the determination process to determine whether the bill being conveyed is damaged on not.

In addition, the reference data storage part 233 stores image data about the legitimate bill to be used, when the above-mentioned authenticity judgment process is carried out, and various kinds of reference data for respective kinds of bills to be utilized in the authenticity judgment, for example, reference values and the like of the printing length of the legitimate bill. In this case, the reference data is stored in the dedicated reference data storage part 233. However, the data may be stored in the above-mentioned ROM 222.

Moreover, the CPU 220 is configured to be connected to the first light emitting part 80*a* and the second light emitting part 81*b* in the aforementioned bill reading means 8 via the I/O port 240. The first light emitting part 80*a* and the second light emitting parts 81*b* are controlled through a light emission control circuit 260 by a control signal from the CPU 220 in accordance with the operation programs stored in the abovementioned ROM 222 such that the lighting interval and the turning-off are controlled.

Figure 8:
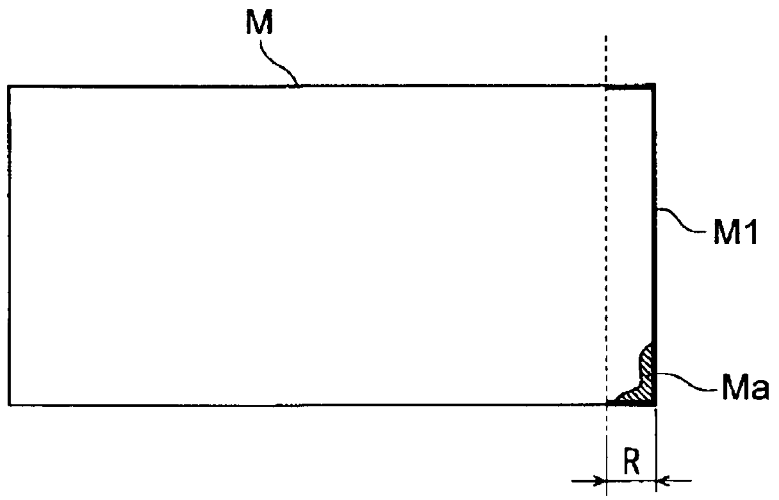
FIG. 8 is a diagram illustrating a bill to be conveyed in a state that a missing portion is caused in a leading end thereof.
Figure 9:
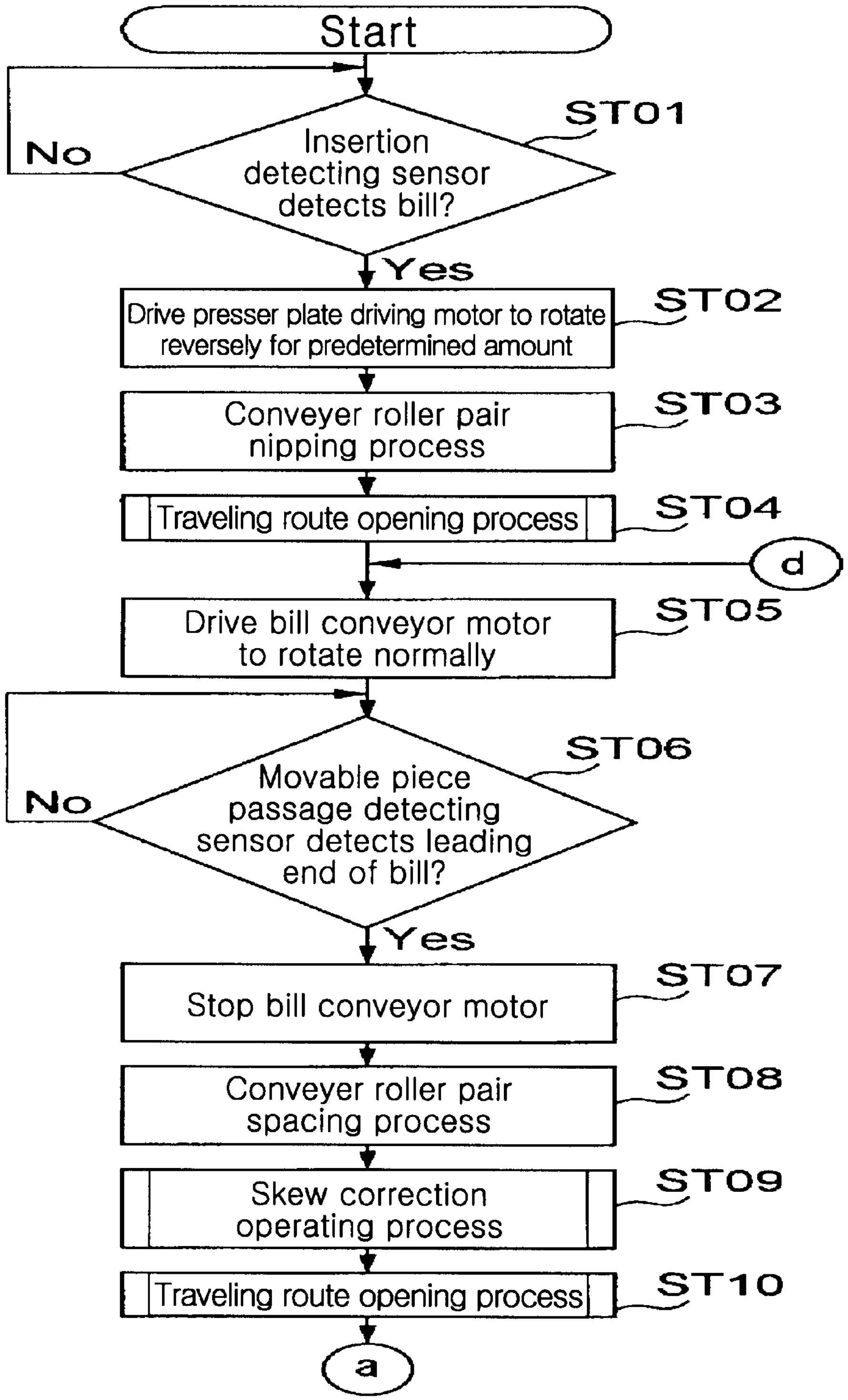
FIG. 9 shows a flowchart (part one) illustrating processing operations for processing a bill in a bill processing apparatus of this embodiment.
Figure 10:
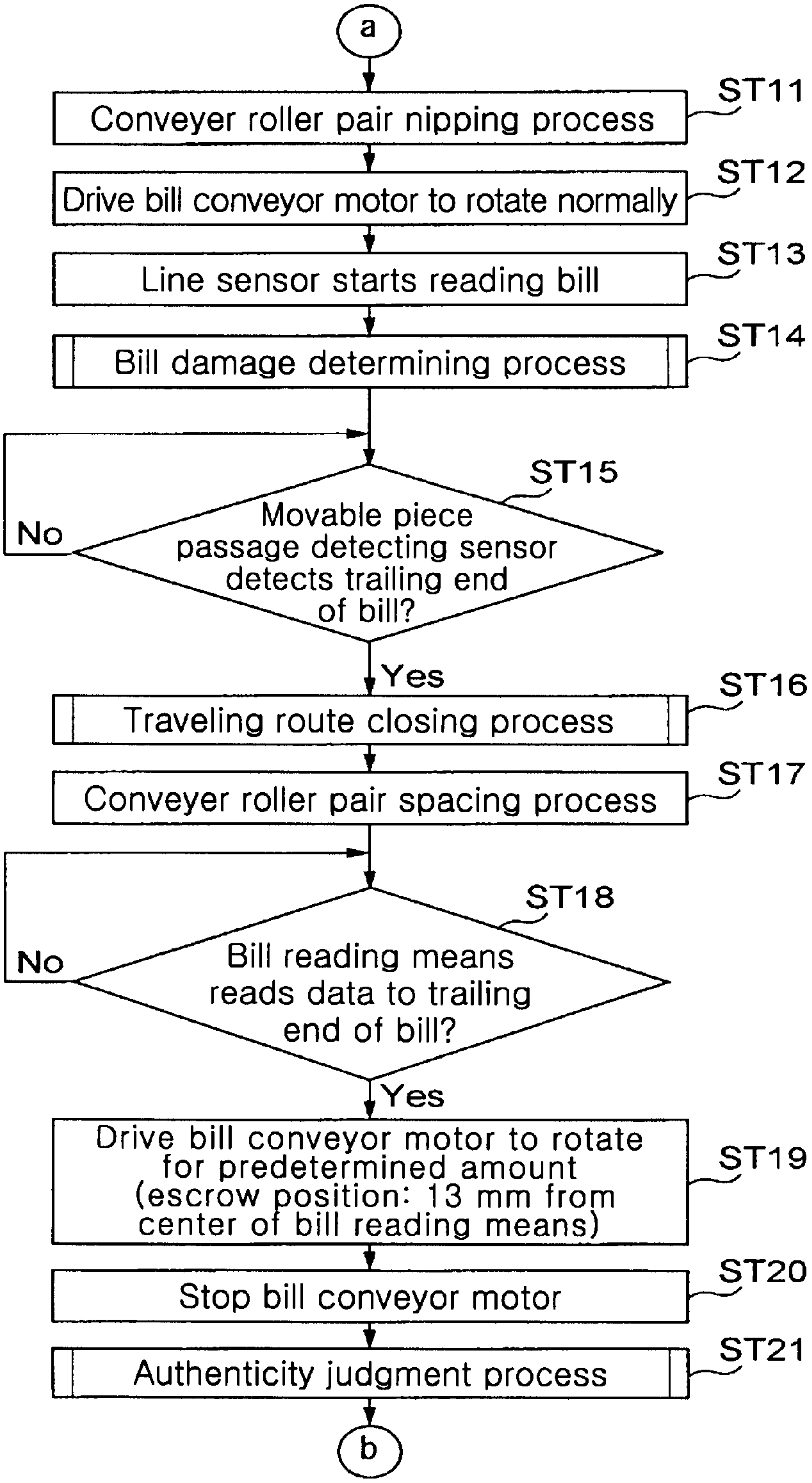
FIG. 10 shows a flowchart (part two) illustrating processing operations for processing the bill in the bill processing apparatus of this embodiment.
Figure 11:
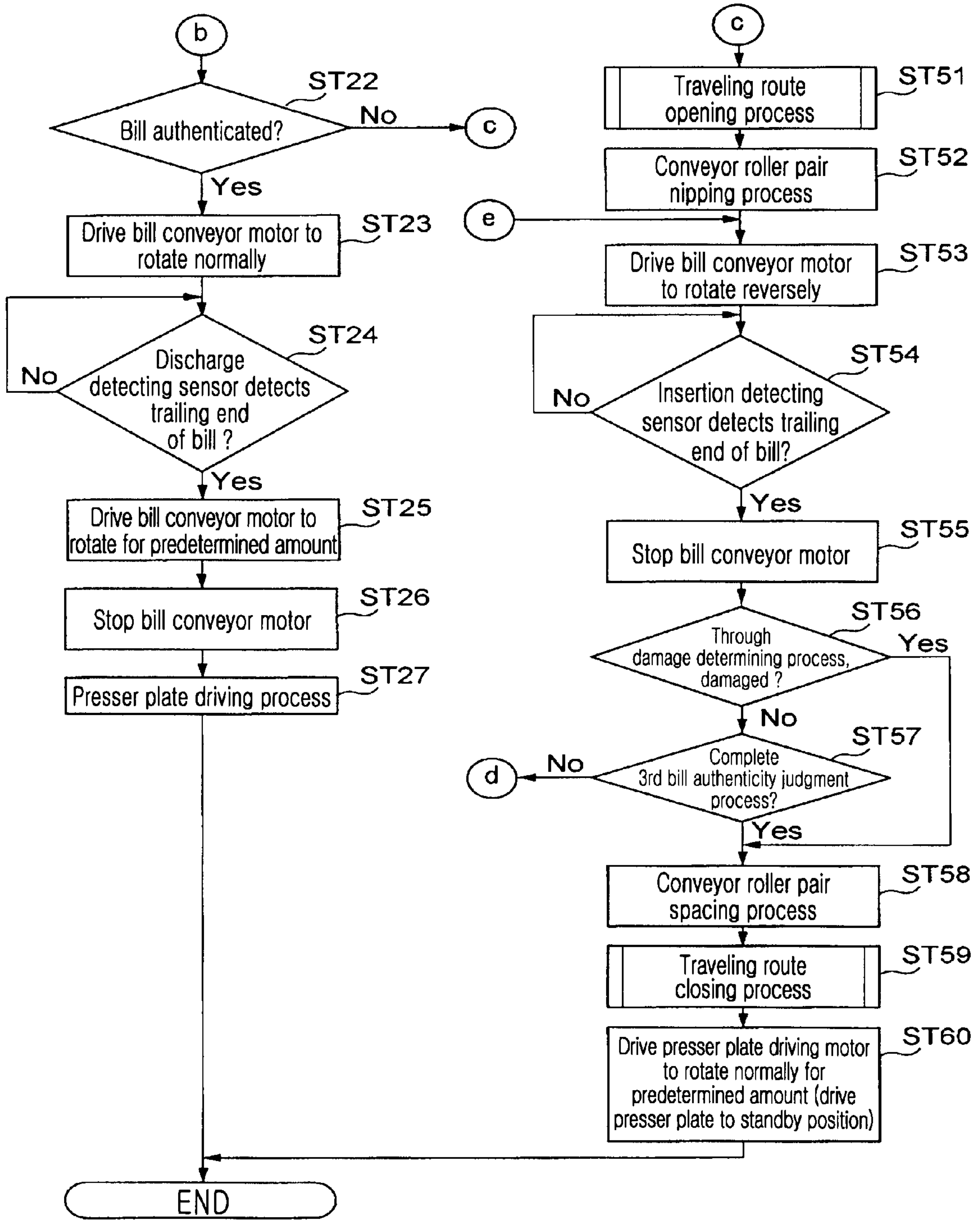
FIG. 11 shows a flowchart (part three) illustrating processing operations for processing the bill in the bill processing apparatus of this embodiment.
Figure 12:
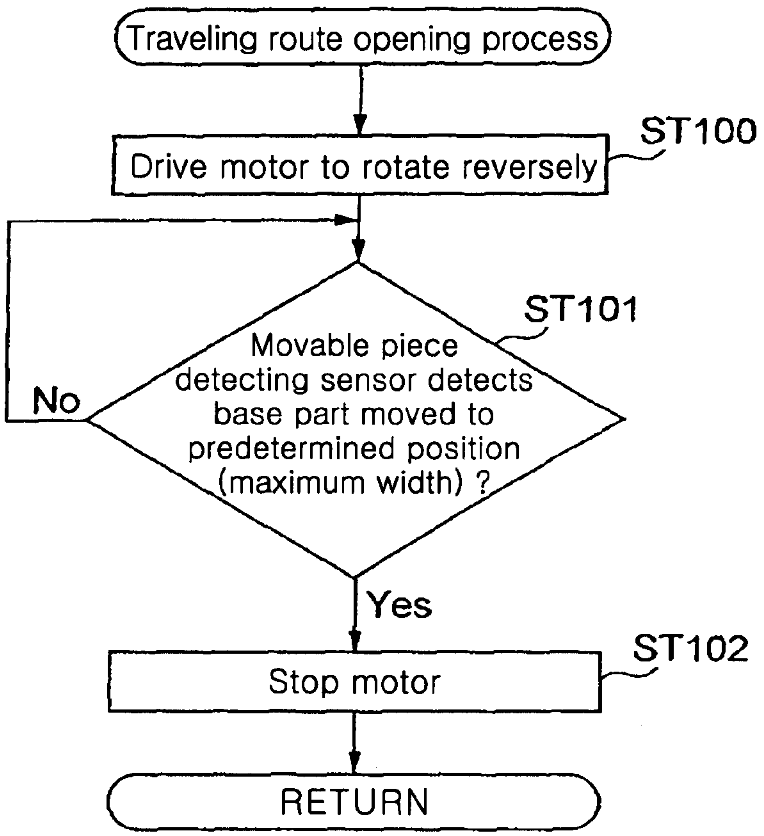
FIG. 12 shows a flowchart illustrating processing operations of a traveling route opening process.

Here, a case in which a bill M having a missing portion in a leading end portion of the bill as shown in FIG. 8 is inserted will be explained.

As described above, the bill reading means 8 irradiates the bill conveyed by the bill conveyance mechanism 6 with lights (red light and infrared light) from the first light emitting part 80*a* and the second light emitting parts 81*b*, and receives a transmitted light or a reflected light therefrom with the light receiving part (line sensor) 81*a*, so as to execute the reading of the bill. It is possible to acquire many pieces of pixel information for a predetermined size of pixel as a unit (for example, one pixel is 0.508 mm in the traveling direction) while the conveyance processing of the bill is conducted in the reading process, and the image data constituted of many pixels (plural pixels) acquired in this way is stored in a RAM 224. In addition, here, the image data constituted of many pixels being stored is converted into color information having brightness (color information to which a numerical value from 0 to 255 (0: black to 255: white) corresponding to each density value is allocated) for each pixel by the converter 231.

In this case, if a bill with a missing portion Ma in a corner of the leading end of the bill M to be conveyed is inserted, and the bill passes through the bill reading means 8, it is possible to specifically acquire the shape of the missing portion Ma by the light receiving part 81*a* having a CCD line sensor installed over the width direction of the bill. This is because, for example, a received light amount of a transmitted light transmitting through the portion of the missing portion Ma is increased with respect to transmitted light data received by the light receiving part 81*a*, or a reflected light is not acquired from the area of the missing portion Ma with respect to reflected light data, etc., it is possible to acquire data of the concrete edge shape (the edge shape with the missing portion Ma) of the bill M to be conveyed based on pixel information converted by the converter 231.

Then, the acquired data on the edge shape and the reference data stored in the reference data storage part 233 (the data on the edge shape of the bill with no missing portion) are compared by the comparison judgment part 235, and a bill with a high degree of similarity is determined as a bill which does not have any missing portions therein, and a bill other than the above is determined as a bill which has a missing portion therein.

In this case, a method for determining a degree of similarity is not particularly limited, however, after acquiring edge information, the number of pixels included in the edge (the number of pixels recognized to constitute the bill) is compared with that of the reference data, and edge information having the number of pixels in the edge greater than or equal to a predetermined threshold value may be determined as similar (bill with no missing portion), and edge information having the number of pixels in the edge less than the predetermined threshold value may be determined as dissimilar (bill with a missing portion).

Further, such determination of whether or not the bill has a missing portion therein is executed before the completion of reading of the bill by the bill reading means 8. In this embodiment, the above-described determination process is executed at a stage where a predetermined range (distance) R (for example, the R is set to 20 mm in this embodiment) from a leading end M1 of the bill M being conveyed is read, and the apparatus is so configured that the bill does not pass through the bill reading means 8 at least before the completion of the determination process. Then, in the case where it is determined that the bill is so damaged as to have a missing portion therein, the above-described CPU 220 drives the bill conveyance mechanism motor 13 to reversely rotate to discharge the inserted bill directly from the bill insertion slot 5.

In addition, the above-described bill damage determination process may be executed before the leading end of the bill passes through the aforementioned pull-out preventing member 170 at the latest. To configure the apparatus in such a condition, it is possible to securely prevent the bill from being stuck at the time of reversely conveying the bill. Further, in a configuration in which the pull-out preventing members 170 are installed at a plurality of places along the traveling direction, a bill damage determination process may be executed before the bill passes through the pull-out preventing member installed at the most upper stream.

Next, the bill processing operation in the bill processing apparatus 1 executed by the control means 200 will be described according to the flowcharts of FIGS. 9 to 15.

When an operator inserts a bill into the bill insertion slot 5, the conveyor roller pair (14A and 14B) installed in the vicinity of the bill insertion slot is in a state that the rollers are spaced from each other in an initial stage (refer to ST17 and ST57 to be described later). Further, with respect to the presser plate 115, the pair of link members 115*a* and 115*b* driving the presser plate 115 are located at the press standby part 108, and the presser plate 115 is positioned in the standby position such that the bill cannot be conveyed-in the press standby part 108 from the receiving port 103 by the pair of link members 115*a* and 115*b*. That is, in this state, the presser plate 115 is brought into the opening formed between the pair of regulatory members 110 such that the condition is so made as to prevent the bills stored in the bill housing part from being drawn out through the opening.

Moreover, the pair of movable pieces 10A constituting the skew correction mechanism 10 located on the downstream side of the conveyor roller pair (14A, 14B) are in a state that the pair of movable pieces 10A are moved to leave the minimum open width therebetween (for example, an interval between the pair of movable pieces 10A is 52 mm; refer to ST16 and ST59 to be described later) so as to prevent the bill from being drawn out in the initial stage.

In the initial state of the above-described pair of conveyor rollers (14A and 14B), it is possible for the operator to easily insert even a bill having wrinkles into the paper sheet insertion slot 5. Then, when insertion of the bill is detected by the insertion detecting sensor 7 (ST01), the driving motor 20 of the above-described presser plate 115 is driven to rotate reversely for a predetermined amount (ST02) to move the presser plate 115 to the initial position. That is, the presser plate 115 is in a state that the presser plate 115 is moved and remains in the opening formed between the pair of regulatory members 110 such that it is so arranged that the bill cannot pass through the opening until the insertion of another bill is detected by the insertion detecting sensor 7.

When the presser plate 115 is moved from the standby position to the initial position, the press standby part 108 becomes in an open state (refer to FIG. 4) such that the apparatus is in a state that the bill can be conveyed into the bill housing part 100. That is, by driving the motor 20 to rotate reversely for a predetermined amount, the presser plate 115 is moved from the standby position to the initial position via the main body side gear train 21 and the presser plate driving mechanism 120 (the housing part side gear train 124, the rack formed on the movable member 122, and the link members 115*a*, 115*b*).

Further, the above-described roller up-and-down motor 70 is driven to move the upper conveyor roller 14A so as to make a contact with the lower conveyor roller 14B. In accordance therewith, the inserted bill is nipped and held therebetween by the pair of conveyor rollers (14A and 14B) (ST03).

Next, a traveling route opening process is conducted (ST04). The opening process is conducted by driving the pair of movable pieces 10A to move in separating directions so as to become apart with each other as the motor 40 for the skew correction mechanism is driven to rotate reversely as shown in the flow chart of FIG. 12 (ST100). At this time, when it is detected that the pair of movable pieces 10A have moved to the predetermined positions (the maximum open width positions) by the movable piece detecting sensor (ST101), the driving operation to rotate the motor 40 reversely is stopped (ST102). This traveling route opening process makes the skew correction mechanism in such a condition as to allow the paper sheet to enter between the pair of movable pieces 10A. In addition, in the previous step of ST04, the bill traveling route 3 is in a closed state by a traveling route closing process (ST16, ST59) to be described later. Thus, the bill traveling route 3 is closed in this way before an insertion of the bill so as to prevent an element such as a line sensor from being broken by, for example, inserting a plate-like member from the bill insertion slot for illicit purposes or the like.

Next, the bill conveyor motor 13 is driven to rotate normally (ST05). The bill is conveyed into the inside of the apparatus by the conveyor roller pair (14A and 14B), and when the movable piece passage detecting sensor 12 installed on the downstream side from the skew correction mechanism 10 detects the leading end of the bill, the bill conveyor motor 13 is stopped (ST06 and ST07). At this time, the bill is located between the pair of movable pieces 10A constituting the skew correction mechanism 10.

Subsequently, the above-described roller up-and-down motor 70 is driven to allow the conveyor roller pair (14A and 14B) holding the bill therebetween to become apart from each other (ST08). At this time, the bill is in a state that no load is applied.

Figure 13:
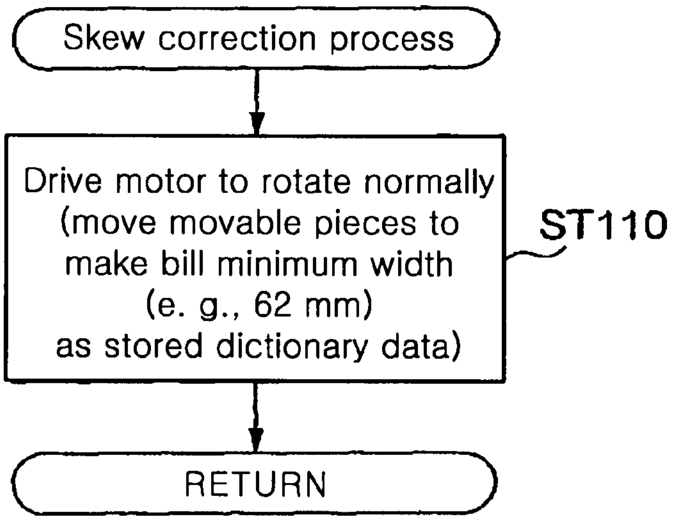
FIG. 13 shows a flowchart illustrating processing operations of a skew correction operating process.

Then, a skew correction operating process is executed as the paper sheet remains in this state (ST09). The skew correction operating process is conducted by driving the motor 40 for the skew correction mechanism to rotate normally to drive the pair of movable pieces 10A to get closer with each other. That is, in this skew correction operating process, as shown in the flowchart of FIG. 13, the motor 40 described above is driven to rotate normally to move the pair of movable pieces 10A in respective directions such that the pair of movable pieces 10A get closer with each other (ST110). The movement of the movable pieces is continued until the distance therebetween becomes the minimum width (for example; width of 62 mm) of the bill registered in the reference data storage part in the control means. And the skew is corrected by the movable pieces 10A touching both sides of the bill such that the bill may be positioned at the accurate center position.

When the skew correction operating process as described above is completed, a traveling route opening process is subsequently executed (ST10). This process is conducted by moving the pair of movable pieces 10A in separating directions as the above-described motor 40 for the skew correction mechanism is driven to rotate reversely (refer to ST100 to ST102 of FIG. 12).

Subsequently, the above-described roller up-and-down motor 70 is driven to move the upper conveyor roller 14A to contact the lower conveyor roller 14B, and the bill is nipped and held between the pair of conveyor rollers (14A and 14B) (ST11). Thereafter, the bill conveyor motor 13 is driven to rotate normally to convey the bill into the inside of the apparatus, and when the bill passes through the bill reading means 8, a reading process of the bill is executed (ST12 and ST13).

Along with the beginning of the bill reading process, the above-described bill damage determination process is executed (ST14). In this damage determination process, as shown in a flowchart of FIG. 15, first, it is judged whether or not a predetermined length of the bill is read (ST150). This predetermined length is, as described above, set to 20 mm from the leading end M1 of the bill M to be conveyed in this embodiment (refer to FIG. 8; R), and at a stage of the completion of reading of the length, the bill determination process part 230 of the control means 200 refers to the reference data stored in the reference data storage part 233, and compares the bill shape data acquired in the comparison judgment part 235 with the data serving as the standard so as to execute a determination process with respect to damages of the bill (ST151).

Then, in the case where it is determined that the bill is damaged in the process in ST151 (ST151; No), the CPU 220 drives the bill conveyor motor 13 so as to discharge the bill immediately from the bill insertion slot 5 (ST53 to ST55). That is, when it is determined that the bill is damaged before the completion of the bill reading process in the process in ST151, the bill is immediately conveyed back without carrying out the following bill reading process so as to be discharged from the bill insertion slot 5, and the series of processes for the bill is completed (ST53 to ST60). Further, in the case where it is determined that the bill is not damaged in the above-described damage determination process (ST14), the bill reading process is continued as it is conveyed (ST15).

In the reading process of the bill, as shown in the timing diagram of FIG. 6, lighting control is performed such that the four light sources constituted of the transmitting light sources of the red light and the infrared light and the reflecting light sources of the red light and the infrared light in the above-mentioned first light emitting part 80*a* and the second light emitting parts 81*b* repeatedly turn on and off the lights with a constant interval, and two or more of the light sources do not simultaneously turn on the lights even without overlapping the on-phases of the respective light sources in any case. In other words, lighting control is performed such that, while any one light source is turned on, the other three light sources are turned off. Thereby, as described in this embodiment, it is possible even for the one light receiving part 81*a* to detect each light from each light source at a constant interval such that an image constituted of contrasting density data on a printed area of the identification object can be read out by a transmitted light and a reflected light of the red light and a transmitted light and a reflected light of the infrared light.

Figure 14:
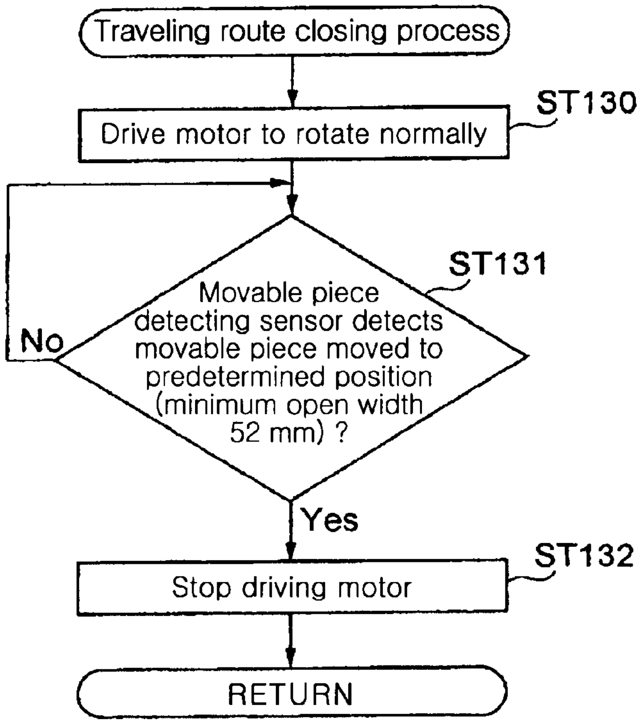
FIG. 14 shows a flowchart illustrating processing operations of a traveling route closing process.
Figure 15:
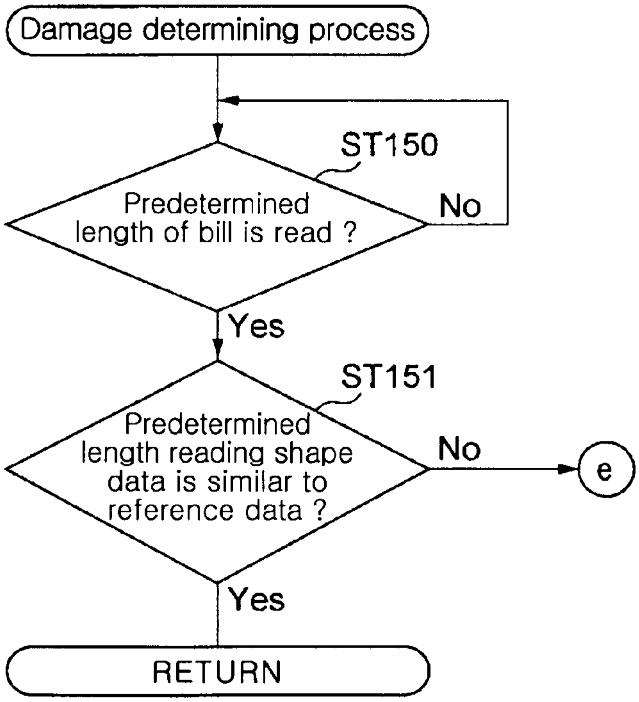
FIG. 15 shows a flowchart illustrating a damage determination process.

Then, when the bill to be conveyed passes through the bill reading means 8, and the trailing end of the bill is detected by the movable piece detecting sensor 12 (ST15), a process for closing the bill traveling route 3 is executed (ST16). In this process, first, as shown in the flowchart of FIG. 14, after the trailing end of the bill is detected by the movable piece detecting sensor 12, the above-described motor 40 is driven to normally rotate to move the pair of movable pieces 10A in the directions that they get closer to each other (ST130). Next, when it is detected by the movable piece detecting sensor that the movable pieces 10A move to the predetermined positions (minimum open width positions: for example, width of 52 mm) (ST131), the driving operation of the normal rotation of the motor 40 is stopped (ST132).

With this traveling route closing process, the pair of movable pieces 10A are moved to the positions of the minimum open width (width of 52 mm) narrower than the width of any bill allowed to be inserted, thereby effectively preventing the bill from being drawn out. That is, by executing such a bill traveling route closing process, an opening distance between the movable pieces 10A is made shorter than the width of the inserted bill, thereby enabling the effective prevention of an action of drawing-out the bill in the direction toward the insertion slot by the operator for illicit purposes.

In succession to the traveling route closing process described above (ST16), a conveyor roller pair spacing process in which the driving source 70 is driven to allow the conveyor roller pair (14A and 14B) coming to hold the paper sheet therebetween to be spaced from one another is executed (ST17). By executing the conveyor roller pair spacing process, even if the operator additionally inserts (double insertion) another bill by mistake, the bill is not subject to a feeding operation by the conveyor roller pair (14A and 14B) and hits front ends of the pair of movable pieces 10A in a closed state according to ST16 such that it is possible to reliably prevent the operation of bill double-insertion.

Along with the bill traveling route closing process as mentioned above, when the bill reading means 8 reads the data up to the trailing end of the bill, the bill conveyor motor 13 is driven for a predetermined amount and stops the bill in a predetermined position (an escrow position; a position where the bill is conveyed toward the downstream by 13 mm from the center position of the bill reading means 8), and at this time, an authenticity judgment process of the bill is executed in the comparison judgment part 235 by referring to the reference data stored in the reference data storage part 233 in the authenticity judging part 230 of the aforementioned control means 200 (ST18 to ST21).

In the bill authenticity judgment process at ST21 as described above, when the bill is judged as a legitimate bill (ST22; Yes), the motor 13 for the bill conveyance is rotated normally (ST23). While the bill is conveyed, the bill conveyor motor 13 is driven to rotate normally until the trailing end of the bill is detected by the discharge detecting sensor 18, and after the trailing end of the bill is detected by the discharge detecting sensor 18 (ST24), the bill conveyor motor 13 is driven to rotate normally for the predetermined amount (ST25 and ST26).

The process for driving the bill conveyor motor 13 to rotate normally in ST25 and ST26 corresponds to a driving amount for which the bill is conveyed in the receiving port 103 of the bill housing part 100 from the discharge slot 3*a* on the downstream side of the bill traveling route 3 of the apparatus main body 2 so that the pair of belts 150 contact the surface on both sides of the conveyed-in bill to guide the bill stably to the press standby part 108. That is, by further driving the bill conveyor motor 13 to rotate normally for a predetermined amount after the trailing end of the bill is detected by the discharge detecting sensor 18, the pair of belts 150 contact the bill conveyed-in and are driven in the bill feeding direction so as to guide the bill in a stable state to the press standby part 108.

Then, after the above-described bill conveyor motor 13 is stopped, the process for driving the presser plate 115 is executed (ST27) such that the bill is placed on the placing plate 105. And, after the pressing process is completed, the presser plate 115 is again moved to the standby position and stopped in the position.

Also, in the process of ST22 as described above, when the inserted bill is judged as a non-legitimate bill (ST22; No), a traveling route opening process is executed (ST51, refer to ST100 to ST102 of FIG. 12), then, the bill conveyor motor 13 is driven to rotate reversely, and the conveyor roller pair (14A and 14B) are brought into contact with each other such that the bill waiting at the escrow position is conveyed toward the bill insertion slot 5 (ST52 and ST53).

Further, with the configuration of this embodiment, even when it is judged that the read bill is not the legitimate bill, the bill is not immediately discharged out of the apparatus, but a reading process is repeated for a predetermined number of times (three times) as shown in the following steps.

That is, when the bill is conveyed toward the bill insertion slot 5 in ST53 as described above, and the insertion detecting sensor 7 detects the trailing end (here, it is corresponding to the leading end M1 in FIG. 8) of the bill to be returned toward the bill insertion slot 5, the driving to reversely rotate the bill conveyor motor 13 is stopped (ST54, ST55). At this time, in the above-mentioned damage determination process, when the bill is a non-damaged bill, it is judged whether or not the bill authenticity judgment process has been carried out for three times (ST57), and when the bill authenticity judgment process is not carried out three times (ST57, No), the above-mentioned processes in the step of ST05 and subsequent steps thereof are performed (This re-try process is repeated twice). Further, when the bill authenticity judgment process has been carried out for three times (ST57, Yes), the bill authenticity judgment process is no longer carried out, and a discharge process thereof is performed.

This discharge process is executed by driving the roller up-and-down motor 70 to allow the conveyor roller pair (14A and 14B) holding the bill therebetween in the ST52 to become apart from each other (ST58). And, after that, the traveling route closing process is executed (refer to ST59, and ST130 to ST132 in FIG. 14) and the driving motor 20 for the presser plate 115 is driven to rotate normally for a predetermined amount (ST60) such that the presser plate 115 positioned in the initial position is driven to move to the standby position, and then a series of processes is completed.

In addition, as described above, a discharge process for the bill determined as a damaged bill is executed such that the bill is discharged immediately from the bill insertion slot 5 (ST53 to ST55) by reversely rotating the bill conveyor motor 13 during reading motion, the discharge process is performed without carrying out the bill reading processes for three times in total in ST57 (ST56; Yes), and then the series of processes is completed (ST58 to ST60).

In accordance with the bill processing apparatus with the above-described configuration, it is determined by the bill determination process part 230 whether or not the leading end area of the bill (within a range of 20 mm from the leading end) is damaged before the completion of reading of the bill which is conveyed by the bill conveyance mechanism 6 to pass through the bill reading means 8, and the motor 13 of the bill conveyance mechanism 6 is controlled to be driven based on its determined result. Therefore, the damaged bill is not conveyed toward the downstream in the apparatus, whereby a bill conveyance failure may be prevented. In particular, in the above-described embodiment, in the case where it is determined that the leading end area of the bill is damaged, the bill is conveyed toward the bill insertion slot 5 side without carrying out the following reading process, therefore, it is possible to securely return the damaged bill toward the bill insertion slot 5 side before the bill passes through the pull-out preventing member 170, whereby the bill conveyance failure may be certainly prevented. That is, since the damage determination process is executed before the bill passes through the pull-out preventing member 170 which easily causes the bill to be stuck or the like at the time of conveying the bill reversely, to return the damaged bill, whereby the bill conveyance failure may be certainly prevented.

Further, for the bill reading process, the line sensor reading the overall range in the width direction of the traveling route of the bill being conveyed is utilized, therefore, even in the case where the bill is conveyed in a one-sided manner in the width direction of the traveling route, whereby damages of the bill may be certainly detected.

As mentioned above, the embodiment of the present invention is described. However, the present invention is not limited to the above-described embodiments, and various modifications of the present invention can be implemented.

The present invention has a feature that a damage of a bill may be detected and it is controlled to prevent the bill with the detected damage from being conveyed toward the downstream side if a leading end portion of the bill to be inserted is damaged so as to cause a missing portion therein. And the other configurations are not limited to the above-described embodiment, but may be modified in various manners. For example, a configuration, arrangement, etc. of the of the bill reading means 8 and the pull-out preventing member 170 may be appropriately modified. Further, a method of determining whether or not a bill is damaged may also be appropriately modified according to a configuration of the bill reading means.

Figure 16A:
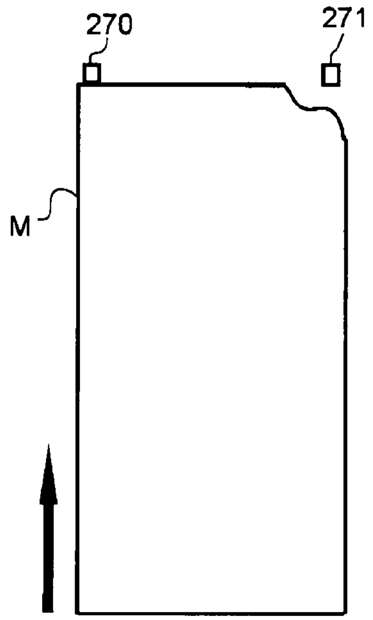
FIG. 16A is a diagram illustrating a state that a bill having a missing portion is conveyed so as to bump into a pull-out preventing member.
Figure 16B:
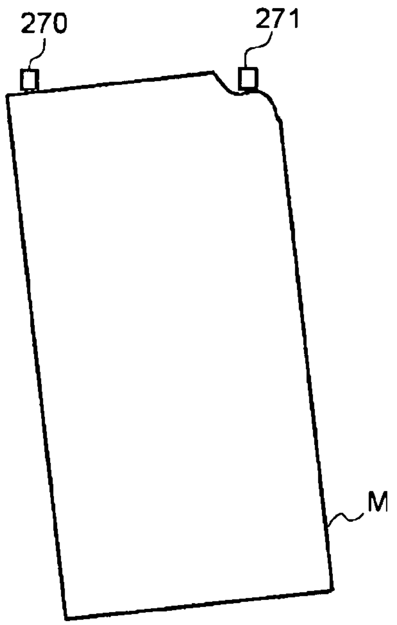
FIG. 16B is a diagram illustrating a state that the bill having the missing portion is inclined after it is conveyed and bumps into the pull-out preventing member.
Figure 17A:
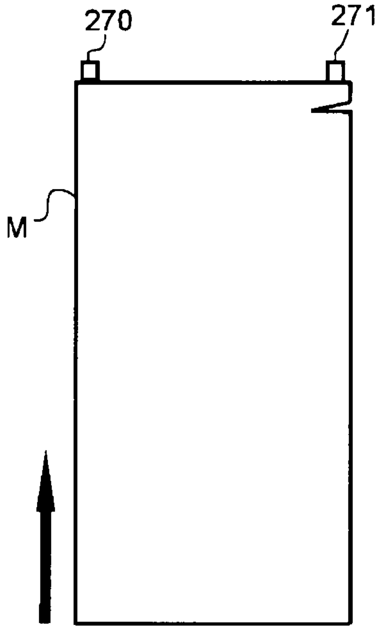
FIG. 17A is a diagram illustrating a state that a bill having a crack near a leading end portion thereof is conveyed so as to bump into a pull-out preventing member.
Figure 17B:
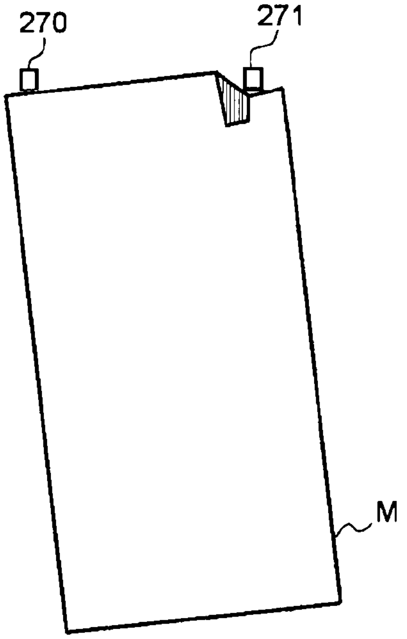
FIG. 17B is a diagram illustrating a state that the bill having the crack near the leading end portion is inclined after it is conveyed and bumps into the pull-out preventing member.

In this embodiment, damages of the bill may mean loss (or a defect) mainly in the leading end M1 and a leading end area near the leading end M1 of a piece of paper or the like constituting the bill as shown in FIG. 8. Such damages appearing at the leading end M1 and/or a marginal side (edge) of the bill may be stuck on members constituting the traveling route 3 (for example, protrusions, depressed portions, and the like), the components provided for the traveling route 3, and other adjacent members. If a damaged portion is once stuck, the portion is stopped while other portions attempt to move at a previous traveling speed. And therefore, the bill may be twisted so as to cause a paper jam. Further, for example, the damaged portion may mean what can trigger the paper jam as the bill touches the pull-out preventing member installed on the downstream side of the reading means including the reading apparatus. For example, as shown in FIGS. 16A to 17B, in the case where a plurality of pull-out preventing members are installed in the width direction of the traveling route (270 and 271 (refer to FIG. 2 for the surrounding configuration)), a bill M having a missing portion in the leading end as the portion corresponds to one of the pull-out preventing members may be tilted because the leading end of the bill M bumps into the left and right pull-out preventing members 270 and 271 in different timings (FIG. 16B). On the other hand, a part adjacent to the leading end is missing so as to make a peninsulated portion and such portion may not have sufficient stiffness such that the portion may be folded. In this case, the bill M may be inclined by a mechanism in substantially the same way as the bill with the missing portion as shown in FIGS. 16A and 16B (FIG. 17B). In the above-described case, the inclined bill M may protrude from the traveling route so as to be hooked by one of the peripheral members, which may cause a paper jam finally. In the embodiment described above, the missing portion in a predetermined area (leading end area) on the housing part side in the bill traveling direction can be detected so that such a damaged bill may be discharged in an early stage. As described above, when bills in various kinds of conditions (for example, a bill which is a legitimate bill, but is damaged to have a missing portion in its leading end portion, and so on) are inserted by the user, a conveyance failure such as hooking the bill during the conveyance may be caused. In particular, provided that the pull-out prevention mechanisms 270 and 271 as described above are installed in the bill traveling route, a bill may be easily stuck on the portions, which is more likely to cause a conveyance failure.

Further, the leading end area to be measured for damage detection becomes larger if a distance R is increased. When the distance R is too short, a missing portion in the leading end portion may not be able to be detected. A leading end edge of the bill is ideally straight, however, since a slight inclination or unevenness in the marginal side (zigzag shape) may exist in practice, these may be judged as missing portions or, by adopting a standard by which these are not judged as missing portions, these missing portions may not be judged as real missing portions. Further, in the case where the missing portion greatly exceeds the distance R, the entire image of the missing portion may not be grasped, so that it may be difficult to evaluate the missing portions. In particular, evaluation of an edge shape and evaluation of a missing portion are easily mixed up, and a so-called quantization error is easily generated. On the other hand, in the case where the distance R is too long, it may be difficult to detect a missing portion. This is because, in the case where the distance R is long and a leading end area is broad, a percentage of pixels of a missing portion with regard to the entirety is decreased, edge portions providing errors in the number of pixels as well stretch to the sides according to an increase in R. In other words, detection sensitivity for missing portions by pixels is lowered. For example, this distance R is thought to be preferably greater than or equal to a thousandth of a length in the longitudinal direction of a bill.

Further, it is preferable that the aforementioned leading end area does not reach the aforementioned specified area. The data measurement for the leading end area may be performed in order to eliminate undesirable bills before an authenticity judgment. Then, it is more preferable that it is possible to eliminate undesirable bills before the data measurement for the specified area and/or the judgment of measured data for an authenticity judgment. Accordingly, the measurement by the same reading apparatus or different apparatuses simultaneously reading a same position of a bill is performed from the leading end at the forefront in the traveling direction of the bill as a general rule. However, provided that it is possible to eliminate undesirable bills by only measurement of a leading end area first, the bill processes are effectively performed, and further, less burden is imposed on the authenticity judging system serving as authenticity judging means including the reading apparatus, which is more preferable. For example, assuming that a bill is divided into five pieces in the longitudinal direction (traveling direction), it is thought that specific areas such as watermarks are usually not disposed in the both end pieces. Accordingly, it is considered preferable that the predetermined distance R is less than or equal to a fifth of a length in the longitudinal direction of a bill.

In accordance with the paper sheet processing apparatus in the above-described embodiment, the damage determination means determines damage of a paper sheet before the completion of reading of the paper sheet which is conveyed by the conveyance mechanism to pass through the reading means, and it is possible to control the conveyance mechanism based on its determination result, therefore, it decreases the possibility of conveying a damaged paper sheet toward the downstream in the apparatus, whereby a conveyance failure of the paper sheet may be prevented.

Further, the reading means may be provided with a line sensor reading an entire range in the width direction of the traveling route of a conveyed paper sheet.

In such a configuration, even in the case where the paper sheet is conveyed so as to skew to one position in the width direction of the traveling route, it is possible to certainly detect damages of the paper sheet.

Further, an pull-out preventing member for preventing a paper sheet from being conveyed toward the insertion direction may be installed on the downstream side of the reading means, and the damage determination means is capable of performing a damage determination process for a paper sheet before the paper sheet passes through the pull-out preventing member.

In such a configuration, it is possible to reduce the possibility that a damaged paper sheet is conveyed to be stuck on the pull-out preventing member, which may cause a conveyance failure.

Further, the control means is capable of controlling the conveyance mechanism to convey a paper sheet toward the insertion slot side, and in the case where the paper sheet is determined as a damaged paper sheet by the damage determination means, it is possible to convey the paper sheet toward the insertion slot side.

In such a configuration, it is possible to return a damaged paper sheet toward the bill insertion slot side before the paper sheet passes through the pull-out preventing member, which makes it possible to more certainly prevent a conveyance failure of the paper sheet.

For example, in a paper sheet processing apparatus comprising an insertion slot into which a paper sheet is inserted, a conveyance mechanism capable of conveying the paper sheet inserted from the insertion slot toward a housing part along a traveling route, a reading apparatus which is installed in the traveling route, which starts reading from a leading end at the forefront in the traveling direction of the paper sheet to be conveyed by the conveyance mechanism, and a processor capable of functioning for controlling the conveyance mechanism and the reading apparatus, it is thought preferable that the processor functions to be capable of determining damage of the paper sheet based on a shape of the leading end portion read from the paper sheet by the reading apparatus and a reference shape, and functions to control the conveyance mechanism to be capable of reversely conveying the paper sheet toward the insertion slot side, or to be capable of judging the authenticity of the paper sheet while continuously conveying the paper sheet, based on a determined result of the damage. The processor may include the CPU 220. Determination of damage of a paper sheet may be conveyed out under predetermined conditions (these conditions may be experimentally determined in advance, and may be determined by performing calibration in the apparatus, or these may be combined) by a predetermined program. In order to determine damage of a paper sheet based on a shape of a read leading end portion and a reference shape, the measured shape and the standard shape are compared to determine a difference therebetween. Then, in the case where the difference is judged as significant, it is possible to judge that the measured shape is abnormal (i.e., there is a missing portion). In order to judge whether or not the difference is significant, it is possible to statistically process it by performing calibration or the like. Here, the meaning of that the paper sheet is reversely conveyed toward the insertion slot side may be that the paper sheet is conveyed in a direction opposite to the traveling direction in usual conveyance. For example, this may include that a conveyor roller is reversely rotated to return the paper sheet to the insertion slot.

Further, the aforementioned paper sheet processing apparatus comprises an pull-out preventing member on the downstream side of the reading apparatus with a predetermined distance along the traveling route for preventing a paper sheet from being reversely conveyed toward the insertion slot, and the processor may function to control the conveyance mechanism to be capable of determining the damage before the leading end at the forefront in the traveling direction of the paper sheet reaches the pull-out preventing member. It is preferable that this predetermined distance is sufficiently long by which the leading end of the paper sheet does not touch the above-described pull-out preventing member even when measurement (reading) of data for a damage determination is performed and determination based on the reference data is performed. Even when this predetermined distance is thought to be sufficient, when a traveling speed of the paper sheet is too fast, the leading end of the paper sheet may touch the pull-out preventing member, therefore, it is preferable to control a traveling speed in view of the predetermined distance and the traveling speed.

Further, a paper sheet processing method for judging the authenticity of a paper sheet by use of a reading apparatus can be provided, a paper sheet processing method comprises a carrying step in which a conveyance mechanism conveys a paper sheet inserted from an insertion slot at a predetermined speed toward a housing part along a traveling route, a reading step in which the reading apparatus reads the paper sheet from a leading end at the forefront in its traveling direction in synchronization with the passage speed when the paper sheet passes above the reading apparatus installed in the traveling route at the predetermined speed, a damage determination step of determining presence or absence of damage of the leading end area based on a shape of a leading end area obtained by reading the paper sheet by a predetermined distance from the leading end and a shape serving as a standard, and a control step of controlling the conveyance mechanism to reversely convey the paper sheet toward the insertion slot before performing an authenticity judgment for the paper sheet, when the presence of damage is determined as a result of the damage determination step.

The paper sheet processing method further comprises an authenticity judgment step of judging the authenticity of the paper sheet based on measured data on a specific area posteriorly disposed from the leading end area and reference data in the case where it is determined that there is no damage in the damage determination step. Then, it is preferable that the damage determination step is performed before the leading end of the paper sheet reaches the pull-out preventing member which is provided on the downstream side of the reading apparatus, and for preventing the paper sheet from being reversely conveyed.

As described above, the paper sheet processing apparatus capable of preventing a conveyance failure of the paper sheet may be provided.

The present invention can be incorporated into various types of apparatuses to provide products and services by inserting a bill thereinto, for example.

What is claimed is:

1. A paper sheet processing apparatus comprising:

an insertion slot into which a paper sheet is inserted;

a conveyance mechanism which is capable of conveying the paper sheet having been inserted from the insertion slot;

a reading device which reads the paper sheet being conveyed by the conveyance mechanism; and an authenticity judging unit which determines an authenticity of the paper sheet being read by the reading device based on a reading result of the reading device;

a damage determination unit which determines presence or absence of a damage of the paper sheet based on a shape of a reference paper sheet and a shape of a portion of the paper sheet having been read by the reading device while the reading device reading the paper sheet to obtain the reading result for allowing the authenticity judging unit to determine the authenticity of the paper sheet and before the reading device completes reading the paper sheet for obtaining the reading result; and a control unit which controls conveyance of the paper sheet by the conveyance mechanism based on a determination result by the damage determination unit, wherein when the damage determination unit determines that the paper sheet is a damaged paper sheet, the control unit controls the conveyance mechanism so as to convey the paper sheet toward an insertion slot side without carrying out further reading of the paper sheet for the authenticity and wherein the damage determination unit determines presence or absence of a damage of the paper sheet when the reading device read a predetermined front portion of the paper sheet and the conveyance mechanism conveys the paper sheet not to completely pass though the reading device until the damage determination unit completes the determination.

2. The paper sheet processing apparatus according to claim 1, wherein the reading device comprises: a line sensor to read an entire range in a lateral direction of a traveling route through which the paper sheet is conveyed.

3. The paper sheet processing apparatus according to claim 1, further comprising:

a pull-out prevention member, provided on a downstream side of the reading device, which prevents the paper sheet from being drawn back toward the insertion slot, and wherein:

the damage determination unit conducts a determination process of a damage of the paper sheet before the paper sheet passes through the pull-out prevention member.

4. A paper sheet processing apparatus comprising:

an insertion slot into which a paper sheet is inserted;

a conveyance mechanism capable of conveying the paper sheet having been inserted from the insertion slot toward a housing part along a traveling route;

a reading device which is provided in the traveling route and starts reading the paper sheet from a leading end thereof at a forefront in a traveling direction where the paper sheet is conveyed by the conveyance mechanism;

a processor which is operable in order to control the conveyance mechanism and the reading device, and wherein the processor is operable to:

function to determine presence or absence of a damage of the paper sheet based on a reference shape and a shape of a leading end of the paper sheet which has been read by the reading device while the reading device reads the paper sheet to obtain a reading result for judging an authenticity of the paper sheet and before the reading device completes reading the paper sheet for obtaining the reading result;

control the conveyance mechanism so as to convey back the paper sheet toward an insertion slot side without carrying out further reading of the paper sheet for judging the authenticity, or continue to convey the paper sheet such that the authenticity thereof can be judged based on the reading result of the reading device, based on a result of the damage determination; and a pull-out prevention member which prevents the paper sheet from being drawn back toward the insertion slot and is disposed along the traveling route on a downstream side of the reading device by a predetermined distance, and wherein the processor is operable to control the conveyance mechanism so as to determine the presence or the absence of the damage of the paper sheet before the leading end at the forefront in the traveling direction of the paper sheet reaches the pull-out prevention member and wherein the processor is operable to determine presence or absence of a damage of the paper sheet when the reading device read a predetermined front portion of the paper sheet and to control the conveyance mechanism having the paper sheet not completely pass though the reading device until completion of the damage determination.

5. The paper sheet processing apparatus according to claim 4, wherein the reading device comprises: a line sensor to read a whole range in a lateral direction of a traveling route through which the paper sheet is conveyed by the conveyance mechanism.

6. A method of processing a paper sheet to determine an authenticity of the paper sheet by utilizing a reading device, the method comprising:

a conveyance step of conveying the paper sheet having been inserted from an insertion slot along a traveling route toward a housing part at a predetermined speed;

a reading step of reading the paper sheet by the reading device from a leading end at a forefront in the traveling direction in synchronization with the predetermined speed at which the paper sheet passes when the paper sheet passes over the reading device installed on the traveling route at the predetermined speed;

a damage determination step of determining presence or absence of a damage in a leading end area based on a reference shape and a shape of the leading end area having been read by the reading device while the reading device reads the paper sheet to obtain a reading result for judging an authenticity of the paper sheet and before the reading device completes reading the paper sheet for obtaining the reading result;

a control step of stopping the reading device reading the paper sheet for judging an authenticity and controlling a conveyance mechanism so as to convey back the paper sheet toward the insertion slot when the presence of the damage is determined as a result of the damage determination step, wherein the damage determination step is executed when the reading device read a predetermined front portion of the paper sheet and the paper sheet does not completely pass through the reading device until the damage determination step is completed.

7. The method of processing the paper sheet according to claim 6, further comprising:

an authenticity judgment step of judging the authenticity of the paper sheet based on reference data and measurement data of a specific area arranged behind the leading end area when the absence of the damage is determined as a result of the damage determination step.

8. The method of processing the paper sheet according to claim 6, wherein the damage determination step is conducted before the leading end of the paper sheet reaches a pull-out prevention member to prevent the paper sheet from being drawn back, the pull-out prevention member provided on a downstream side of the reading device.

9. The paper sheet processing apparatus according to claim 2, further comprising:

a pull-out prevention member, provided on a downstream side of the reading device, which prevents the paper sheet from being drawn back toward the insertion slot, and wherein:

the damage determination unit conducts a determination process of a damage of the paper sheet before the paper sheet passes through the pull-out prevention member.

10. The method of processing the paper sheet according to claim 7, wherein the damage determination step is conducted before the leading end of the paper sheet reaches a pull-out prevention member to prevent the paper sheet from being drawn back, the pull-out prevention member provided on a downstream side of the reading device.

11. The paper sheet processing apparatus according to claim 1, wherein when the damage determination unit determines that the paper sheet is a damaged paper sheet, the control unit controls the reading device to stop reading the paper sheet.

12. The paper sheet processing apparatus according to claim 4, wherein when the processor determines that a damage is present on the paper sheet, the processor controls the reading device to stop reading the paper sheet.

13. The method of processing a paper sheet according to claim 6, wherein the control step further comprising controlling the reading device to stop reading the paper sheet when the presence of the damage is determined as a result of the damage determination step.

14. The paper sheet processing apparatus according to claim 1, wherein the reading device comprises a line sensor that receives at least one of transmitted light and reflected light and generates sensing signal which is used as a raw data for producing the reading result and the shape of a portion of the paper sheet.

15. The paper sheet processing apparatus according to claim 4, wherein the reading device comprises a line sensor that receives at least one of transmitted light and reflected light and generates sensing signal which is used as a raw data for producing the reading result and the shape of a leading end of the paper sheet.

16. The method of processing a paper sheet according to claim 6, wherein the reading device comprises a line sensor that receives at least one of transmitted light and reflected light and generates sensing signal which is used as a raw data for producing a reading result for judging the authenticity and the shape of the leading end area for determining presence or absence of a damage.

* * * * *